Feb. 14, 1950 O. FIRING ET AL 2,497,077
LOOM
Filed Dec. 22, 1945 13 Sheets-Sheet 1

INVENTORS.
OSBORNE. FIRING.
LEONARD. M. DORMAN.
BY
R. E. Meech
ATTORNEY

Feb. 14, 1950 O. FIRING ET AL 2,497,077
LOOM
Filed Dec. 22, 1945 13 Sheets-Sheet 2

INVENTORS.
OSBORNE FIRING.
LEONARD. M. DORMAN.
BY
R. E. Meech
ATTORNEY.

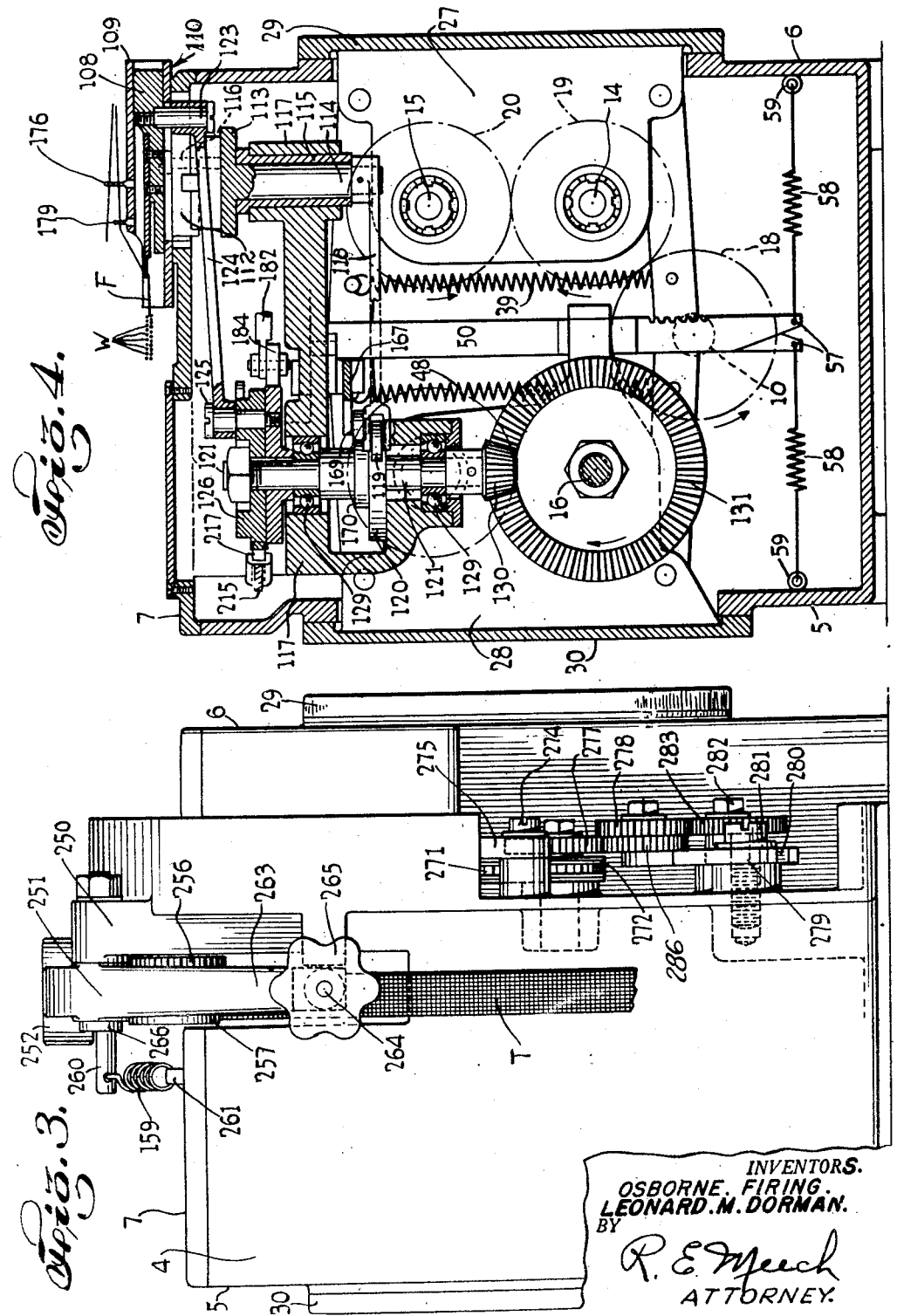

Feb. 14, 1950     O. FIRING ET AL     2,497,077
LOOM
Filed Dec. 22, 1945                       13 Sheets-Sheet 4
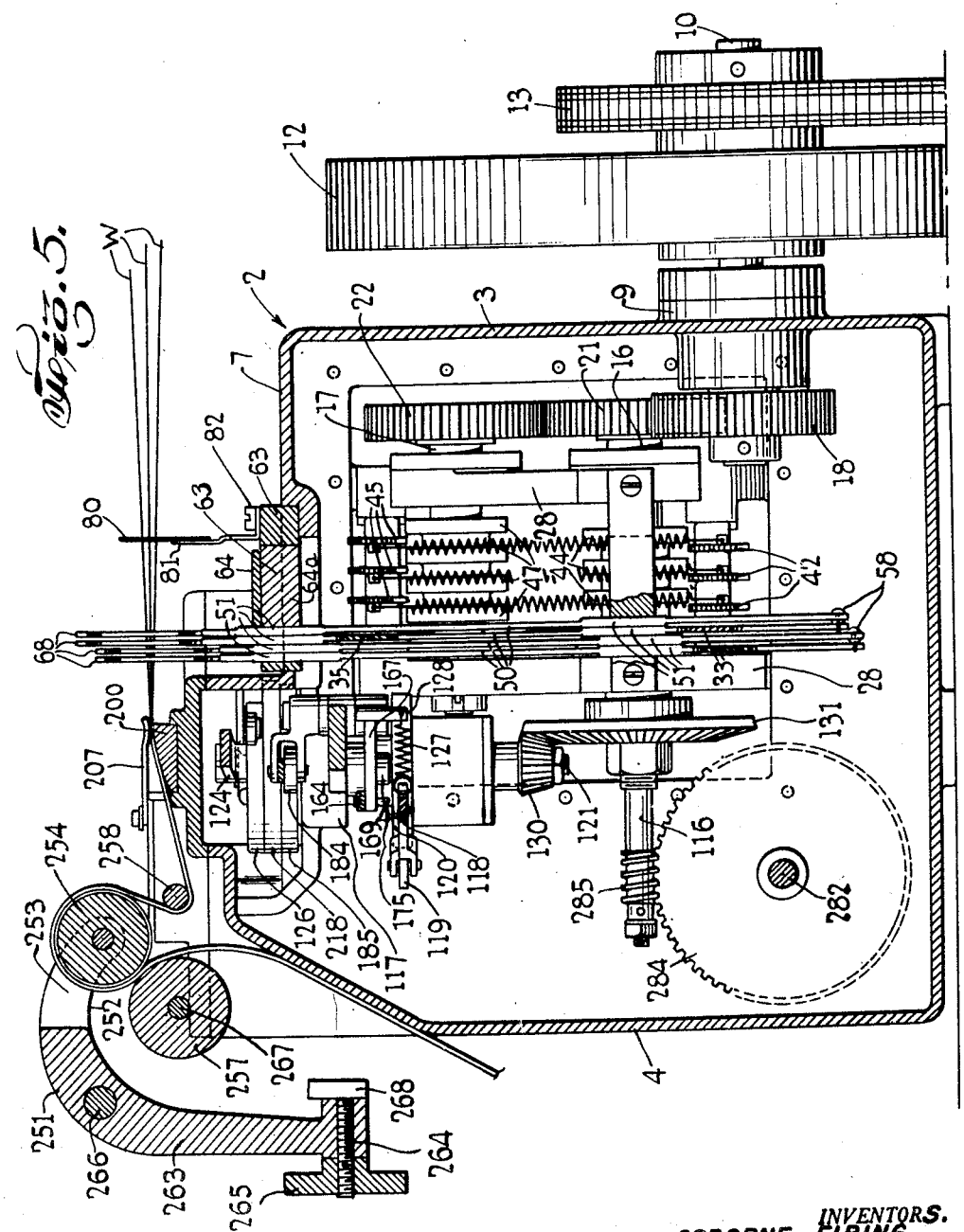
INVENTORS.
OSBORNE FIRING
LEONARD. M. DORMAN.
BY
R. E. Meech
ATTORNEY.

Feb. 14, 1950     O. FIRING ET AL     2,497,077
LOOM
Filed Dec. 22, 1945     13 Sheets-Sheet 5
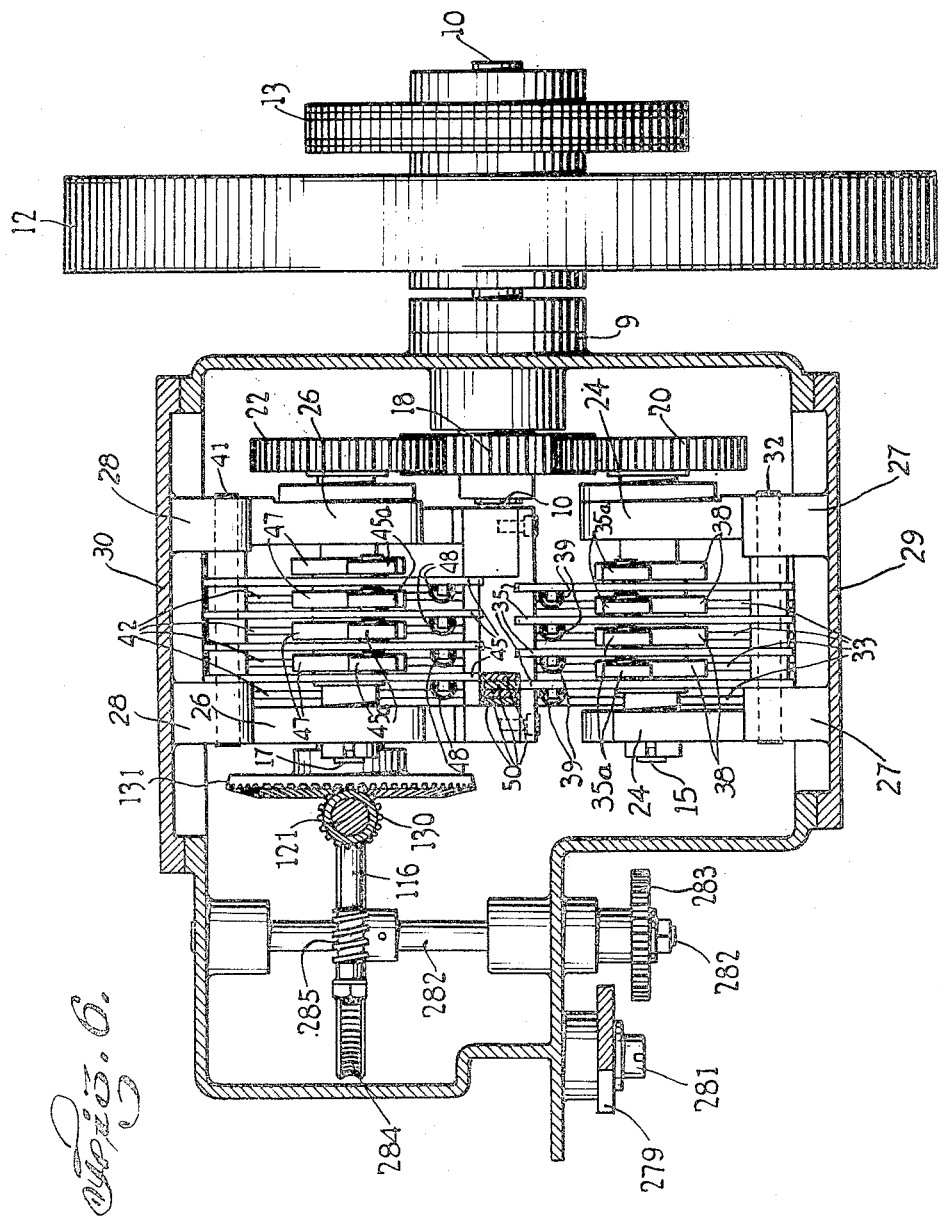
INVENTORS.
OSBORNE. FIRING.
LEONARD. M. DORMAN.
BY
R. E. Meech
ATTORNEY.

Feb. 14, 1950　　　　　O. FIRING ET AL　　　　　2,497,077
LOOM
Filed Dec. 22, 1945　　　　　　　　　　　　　　　13 Sheets-Sheet 6
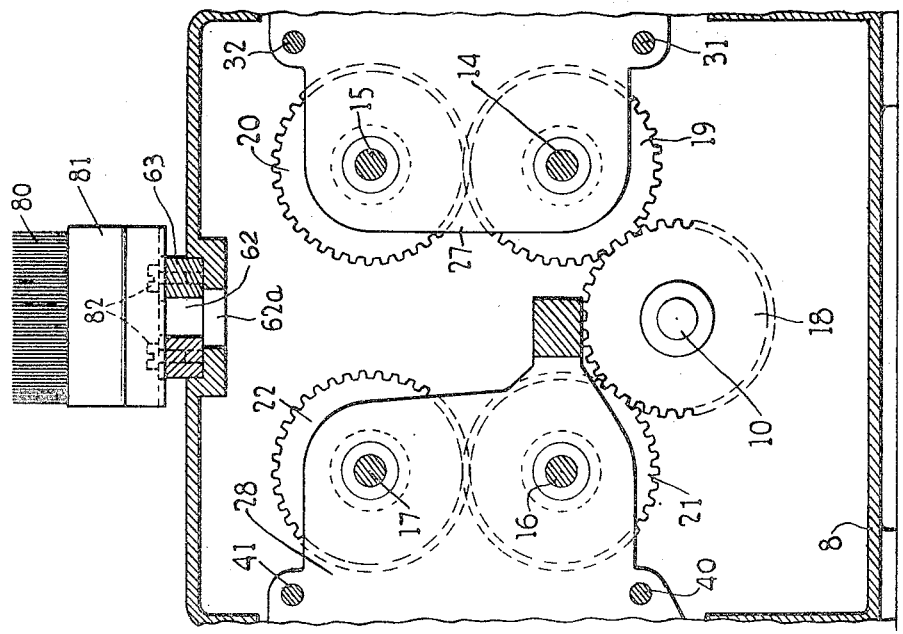
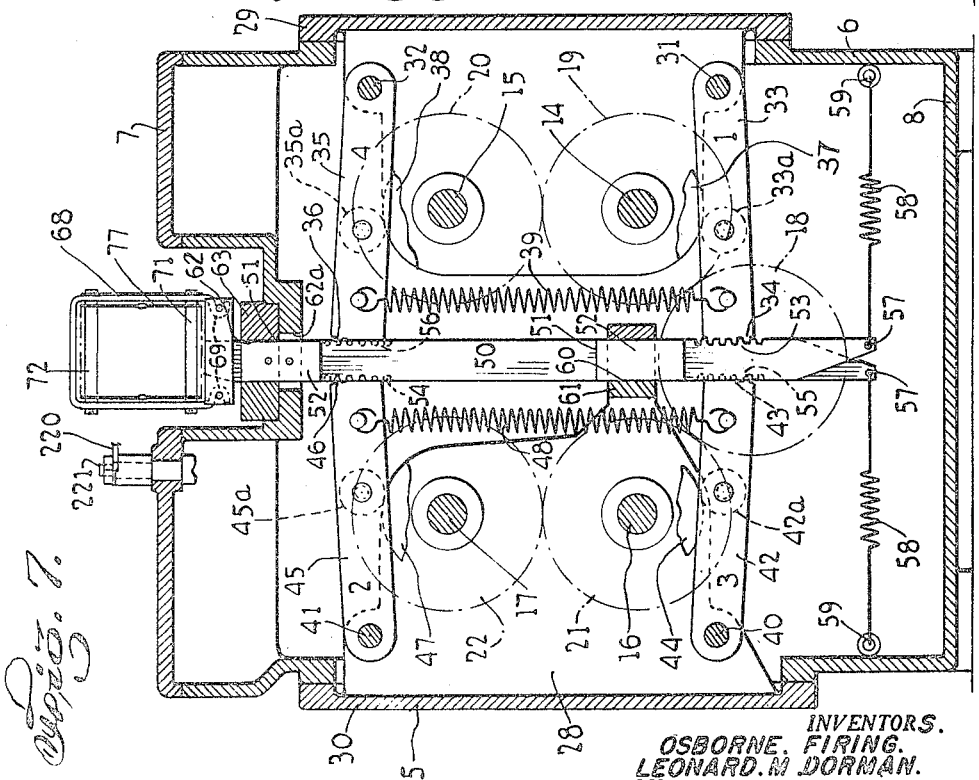
INVENTORS.
OSBORNE. FIRING.
LEONARD. M DORMAN.
BY
R. E. Meech
ATTORNEY.

Feb. 14, 1950     O. FIRING ET AL     2,497,077
LOOM
Filed Dec. 22, 1945     13 Sheets-Sheet 7
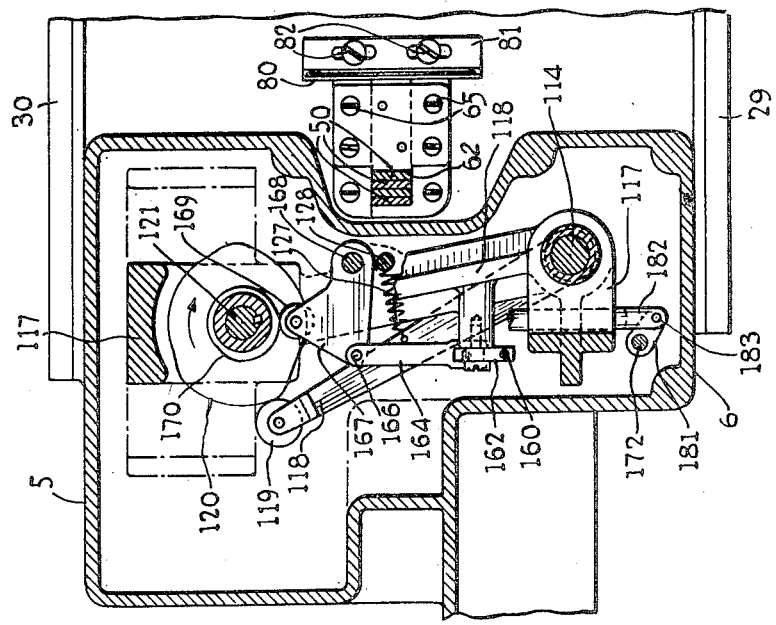
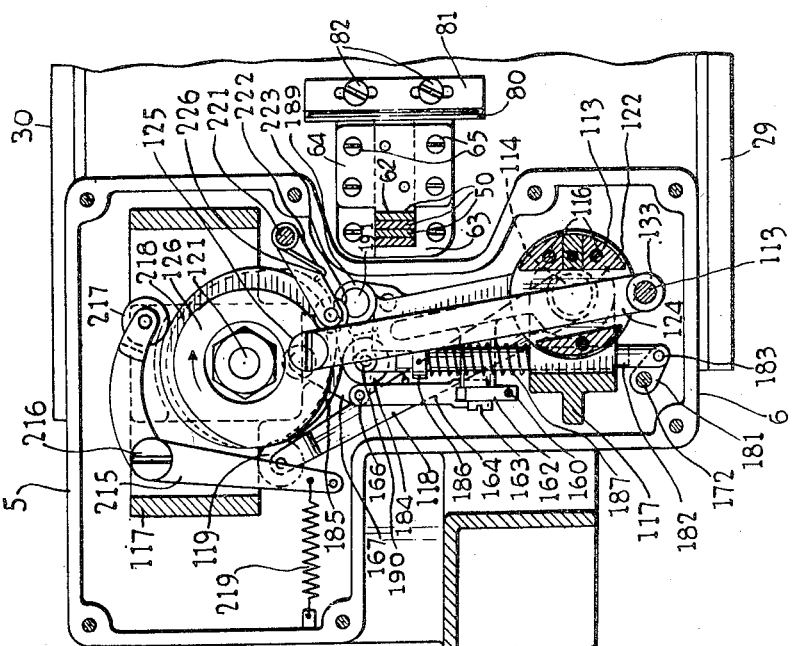
INVENTORS.
OSBORNE. FIRING.
LEONARD. M. DORMAN.
BY
R. E. Meech
ATTORNEY.

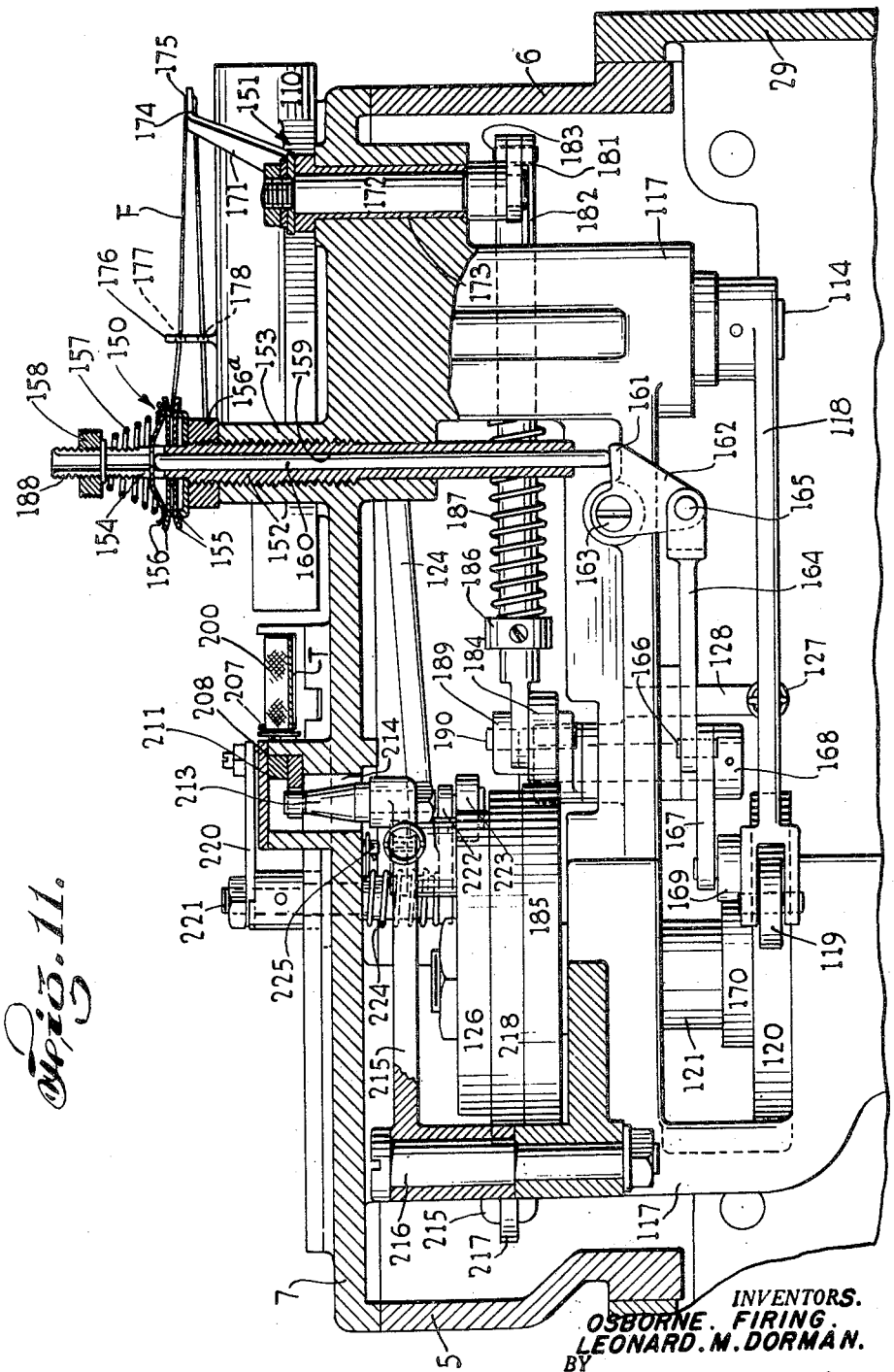

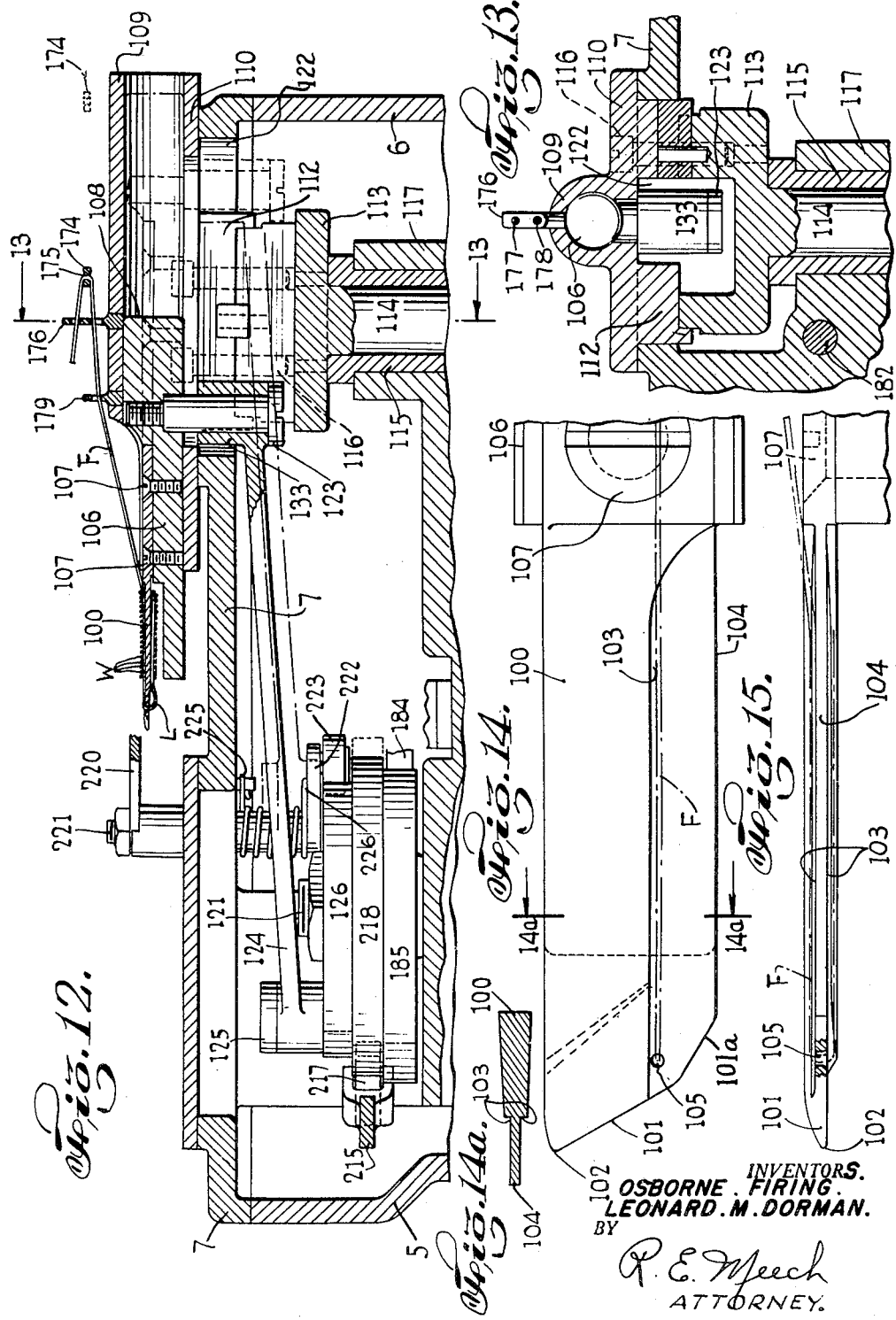

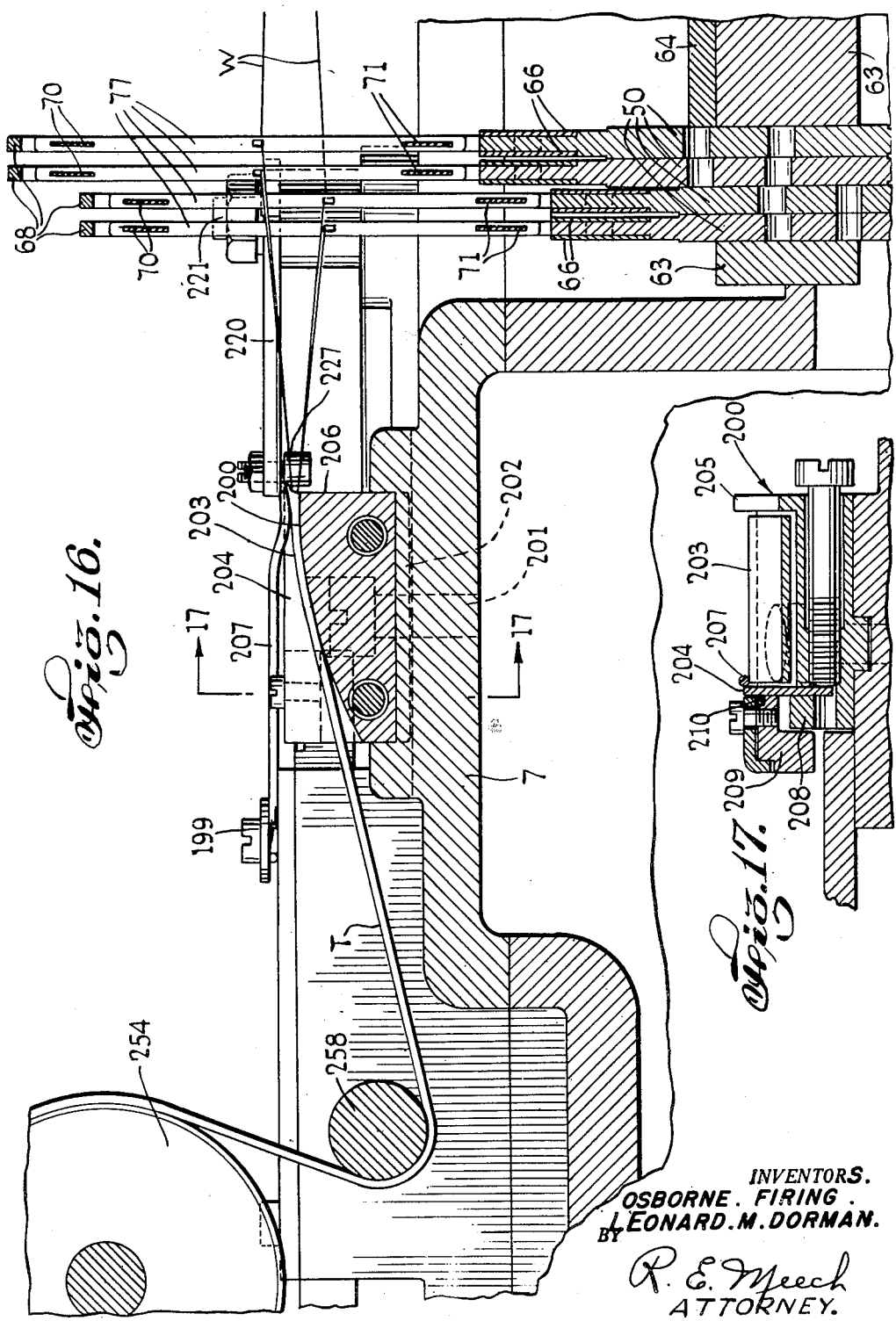

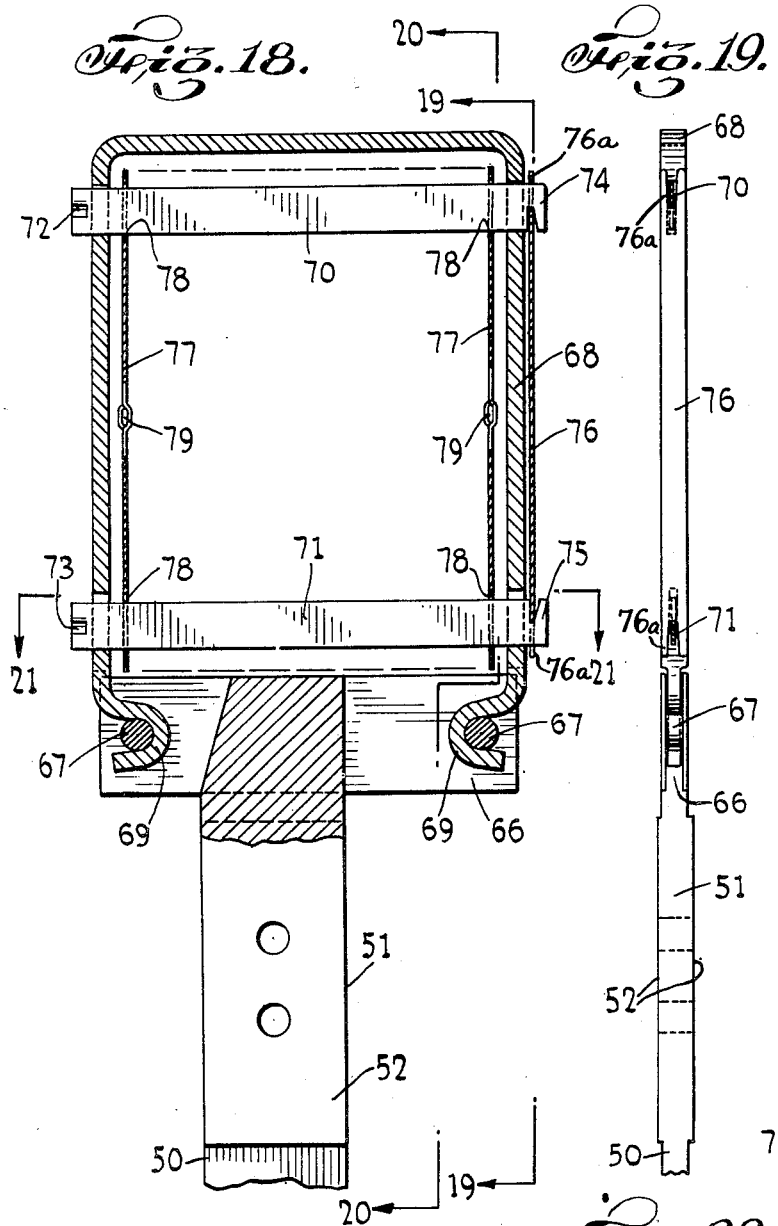
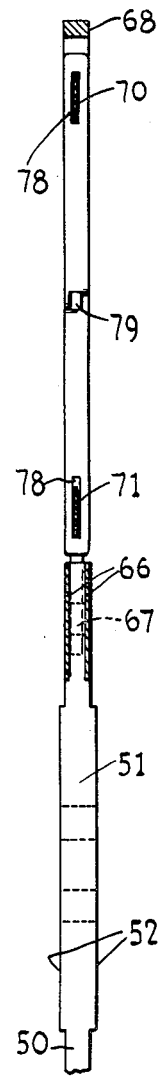
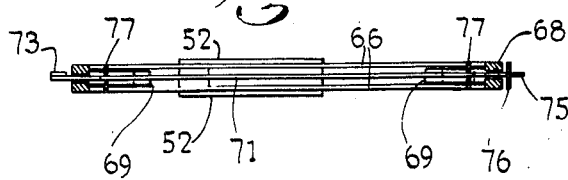

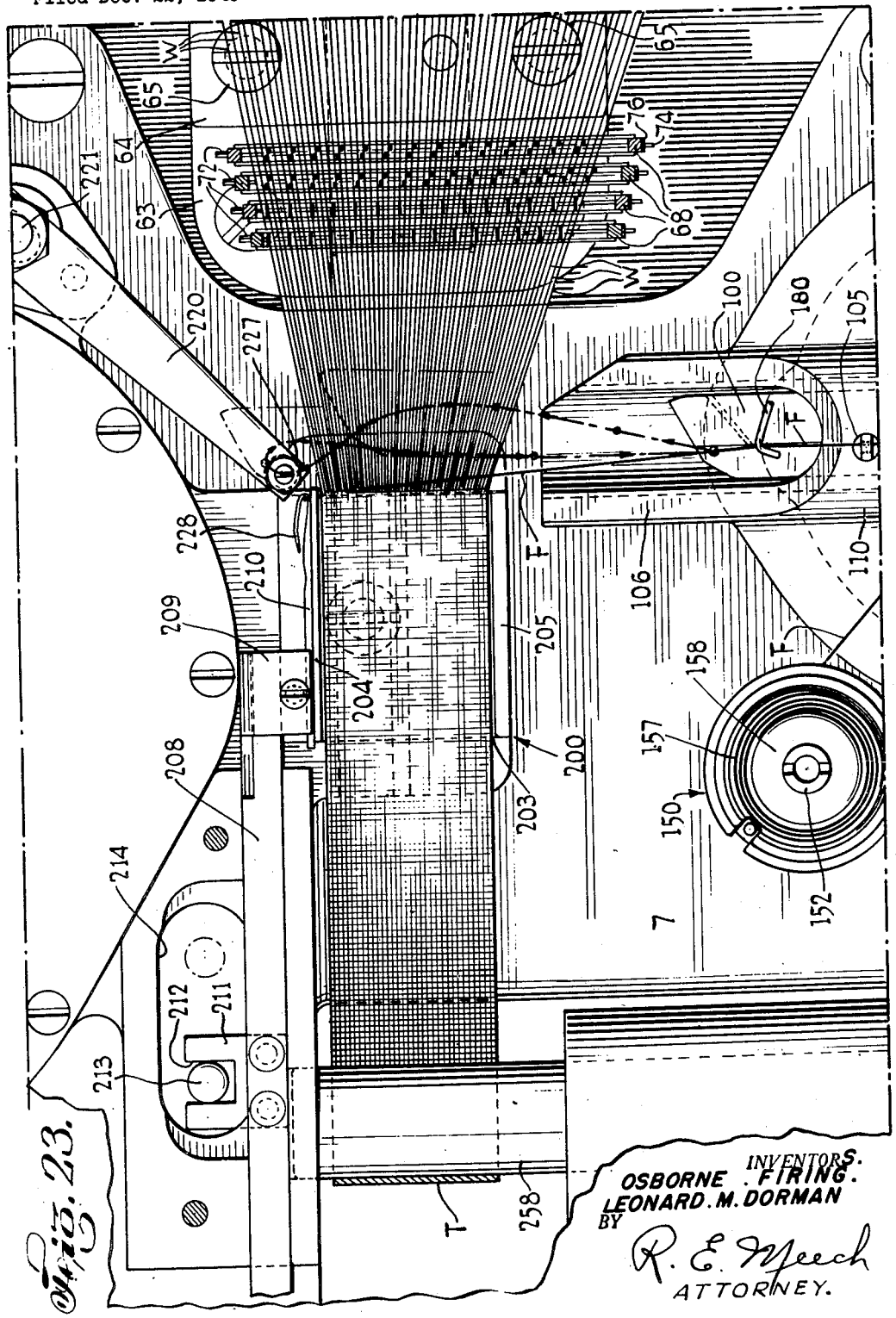

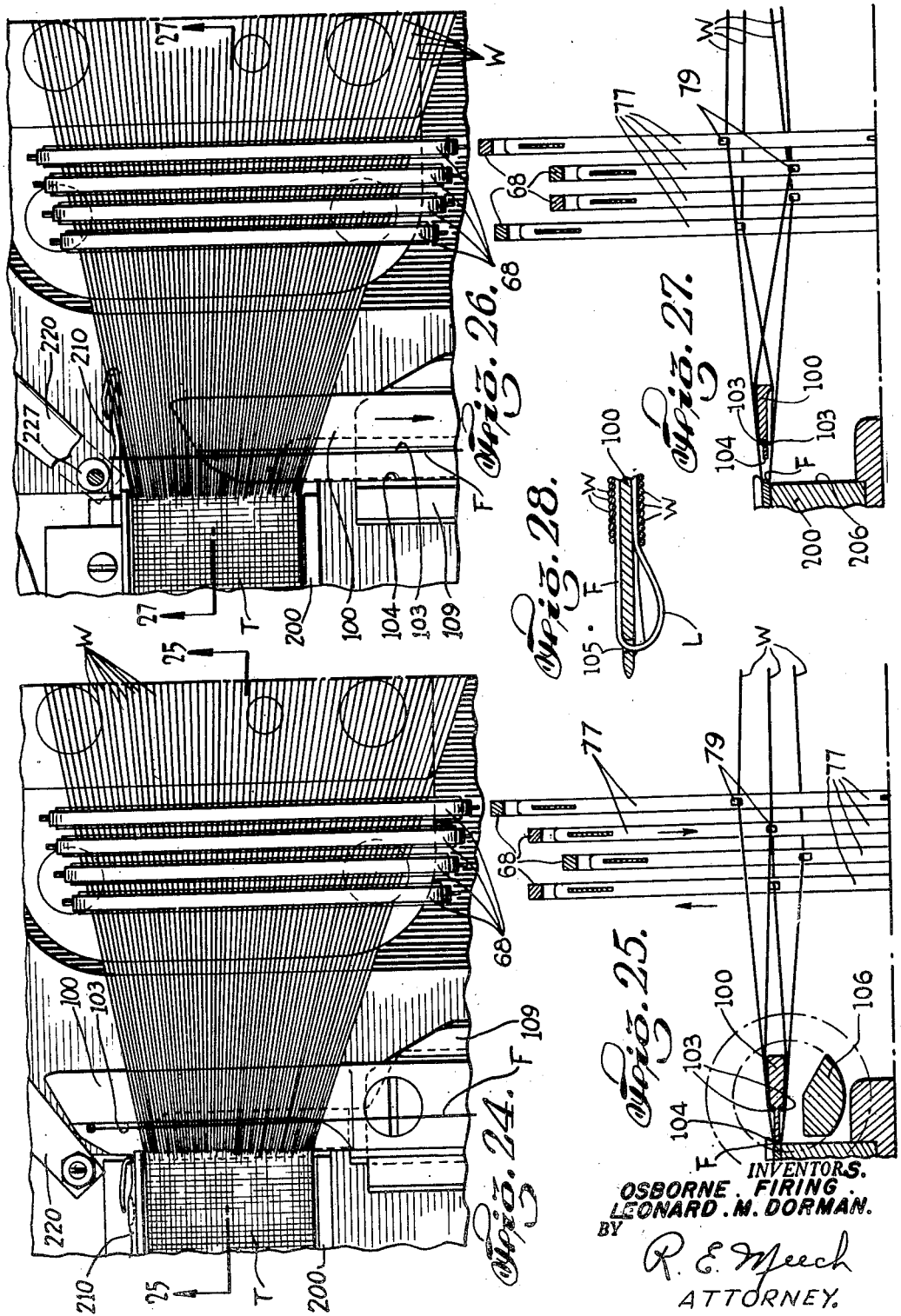

Patented Feb. 14, 1950

2,497,077

UNITED STATES PATENT OFFICE 2,497,077

LOOM

Osborne Firing, Staten Island, N. Y., and Leonard M. Dorman, Meadville, Pa., assignors to Talon, Inc., a corporation of Pennsylvania Application December 22, 1945, Serial No. 636,920

45 Claims. (Cl. 139—124)

This invention relates to looms and, particularly, to an improved loom adaptable for weaving narrow fabrics such as tapes, webbing, ribbon, etc., which is capable of considerably higher speeds of operation than looms heretofore used for such weaving of such products.

The loom of the present invention relates to the class of looms of the so-called "shuttleless" type wherein the weft or filler threads are projected through the shed of the warps by a filling finger or weft needle and wherein another device, usually a knitting needle disposed on the opposite side of the shed, cooperates with the weft needle to catch the loop of weft threads projected through the shed thereby, with such device or knitting needle retaining the loops of filling or weft thread disposed by the weft needle in the warp sheds and knitting each loop through the preceding loop so as to provide a knitted selvage along that edge.

While various types of these shuttleless looms have been heretofore suggested and used, they have been objectionable for one reason or another. In most of these looms the heddles for forming and changing the warp shed were positioned such a great distance from the fell of the fabric being woven that those portions of the warps positioned between the heddles and the fell of the fabric would tend to sag or lag during the changing of the shed and, consequently, the warps were subjected to an excessive strain during the changing of the shed, thereby oftentimes resulting in not providing the proper shed opening or a shed in the proper timed relation for the entrance of the weft needle thereinto. Consequently, a poor and non-uniform product resulted. Also, it will be seen that if the heddles are positioned too great a distance from the fell of the fabric, it is necessary to provide a large and cumbersome machine which necessarily consumes a large amount of floor space. On the other hand, if the heddles are positioned too close to the fell of the fabric, they interfere with the beating up mechanism usually provided in such looms. Also, in such a case a relatively long travel of the heddles is necessary in order to provide sheds having sufficient height to receive the filling finger or weft needle thereby limiting materially the speed at which the loom could be efficiently operated. Also, in most of these looms, the jack and heddle arrangement and the driving means therefor were so constructed and arranged that it was necessary to position the jacks a relatively great distance apart thereby spreading the jack and heddle assembly over a relatively large area which, of course, consumed a large amount of space in the machine and, consequently, the outermost jack and heddle were positioned a great distance from the fell of the fabric which, of course, is objectionable.

In other of these looms, a separate beating mechanism was provided to move the successive picks of the weft threads into position at the fell of the fabric. While it has been heretofore proposed to construct and operate the weft needle in such a manner that it operates both as a means to project the weft threads through the warp sheds and also as means to beat up or move the successive warp threads into position at the fell of the fabric, thereby dispensing with a separate beating up means, the needles heretofore proposed and used for such a combined purpose were constructed and operated in such a manner that only the free end of the needle contacted the weft thread as the needle was being withdrawn from the shed. This was objectionable for the reason that a non-uniform beating up of the weft threads resulted. In other words, the end of the finger or needle in such looms merely crowded the weft thread unevenly into the fell as it was retracted from the shed, and it did not beat up the weft thread simultaneously throughout or co-extensive with the width of the fabric so as to move uniformly the picks of weft thread into the fell, thereby resulting oftentimes in an uneven lay of the weft thread between the warps of the finished product.

Accordingly, it is the general object of the present invention to provide a loom wherein all of the above mentioned disadvantages and others have been eliminated and at the same time, to provide a loom which is small and compact and operable at a greatly increased speed over other looms of the shuttleless type heretofore suggested and used.

It is one of the objects of this invention to provide an improved loom in which all of the heddles are positioned a relatively short distance from the fell of the fabric whereby the heddles need travel only a relatively short distance to form and change the shed between the warp threads, thereby permitting the loom to operate at relatively high speeds.

It is another object of the invention to provide an improved loom wherein the jacks together with the heddles carried thereby are positioned directly next and in slidable engagement with each other so that the overall amount of space occupied by the jacks and heddles is confined to a minimum.

It is a further object of the invention to provide an improved loom of the shuttleless type in which there is provided a relatively thin blade-like needle for projecting loops of the weft thread into and through the warp shed.

It is still another object of this invention to provide a relatively thin blade-like filler or weft needle which not only projects loops of the weft thread through the shed, but acts to beat up the previous picks into the fell of the fabric co-extensive with and simultaneously throughout the width of the fabric.

It is another object of this invention to provide an improved shuttleless loom in which the path of the filler or weft needle follows a relatively small closed curve substantially in the form of a figure 8 and approaching substantially a straight reciprocating movement thereby permitting the heddles to be positioned relatively close to the fell of the fabric.

It is another object of the present invention to provide an improved shuttleless loom in which there is provided a filler or weft needle having means such as ledges or channels arranged in the opposite faces thereof in which the weft thread is disposed when the needle is being projected into and retracted from the shed thereby preventing any undue interference of the warp threads with the weft thread while the needle projects into the shed.

It is a further object of the present invention to provide an improved loom of the shuttleless type in which the shed is changed while the filler or weft needle is in its projected position in the previous shed so as to provide a scissors effect on said needle whereby the loop formed in the weft thread at the end of the needle is maintained therein until it is properly caught at the side of the shed and permitting the loom to operate at relatively high speeds.

It is still a further object of this invention to provide an improved shuttleless loom in which there is provided means for measuring and paying off the weft thread to the filler or weft needle as it passes through the shed with said means drawing the weft thread from its source of supply whereby only an amount of weft thread sufficient for a single pick is permitted to be drawn from the source of supply at one time, thereby preventing the weft thread from sagging or flopping around in the shed and so as to insure that identical lengths of the filler thread are positioned in the shed.

Various other objects and advantages of this invention will be more apparent in the course of the following specification and will be particularly pointed out in the appended claims.

Certain features of the invention shown and described, but not claimed herein, are shown, described and claimed in co-pending applications for a "Loom," Serial No. 75,722, filed February 10, 1949, and a "Harness frame for looms," Serial No. 66,705, filed December 22, 1948.

In the accompanying drawings, there is shown for the purpose of illustration, one embodiment which our invention may assume in practice.

In these drawings:

Fig. 3 is a rear elevational view of the same;

Fig. 4 is a sectional view taken on line 4—4 of Fig. 1;

Fig. 5 is a sectional view taken on line 5—5 of Fig. 1;

Fig. 6 is a sectional view taken on line 6—6 of Fig. 2;

Figure 7 is a sectional view taken on line 7—7 of Fig. 1;

Fig. 8 is a sectional view taken on line 8—8 of Fig. 1;

Fig. 9 is a sectional view taken on line 9—9 of Fig. 2;

Fig. 10 is a sectional view taken on line 10—10 of Fig. 2;

Fig. 11 is a sectional view taken on line 11—11 of Fig. 1;

Fig. 12 is an enlarged cross-sectional view similar to Fig. 4 showing the filler or weft needle assembly at the top of the loom and the driving means therefor;

Fig. 13 is a sectional view taken on line 13—13 of Fig. 12;

Fig. 14 is an enlarged detail view in plan of the improved filler or weft needle of our invention;

Fig. 14a is a sectional view taken on line 14a—14a of Fig. 14;

Fig. 15 is a view partly in section of the forward edge of the needle as shown in Fig. 14;

Fig. 16 is an enlarged cross-sectional view through the upper portion of the loom similar to Fig. 5 showing the fabric beam and the positioning of the heddles for forming a shed between the warp threads;

Fig. 17 is a sectional view taken on line 17—17 of Fig. 16;

Fig. 18 is an enlarged vertical sectional view through one of the heddle frames showing how it is attached to one of the jacks;

Fig. 19 is a sectional view taken on line 19—19 of Fig. 18;

Fig. 20 is a sectional view taken on line 20—20 of Fig. 18;

Fig. 21 is a sectional view taken on line 21—21 of Fig. 18;

Fig. 22 is an enlarged fragmentary view of one of the heddles showing the eye arrangement therein;

Fig. 23 is an enlarged plan view of the loom in the vicinity of the fell of the fabric, showing the movement of the filler or weft needle through the shed of the warps together with the positioning of the weft thread therein;

Fig. 24 is an enlarged plan view of the loom at the point of weaving showing the filler or weft needle in its beating up position in the shed and showing the knitting needle cooperating with the free end of the weft needle to catch the loop of weft thread projected through the shed thereby;

Fig. 25 is a sectional view taken on line 25—25 of Fig. 24 showing the shed changing;

Fig. 26 is an enlarged plan view similar to Fig. 18 showing the filler or weft needle being retracted from the shed after the knitting needle has passed through and caught the loop of weft thread;

Fig. 27 is a sectional view taken on line 27—27 of Fig. 26 showing the shed changed while the filler or weft needle is still projected into the previously formed shed so as to provide a scissors effect on the weft needle; and Fig. 28 is a fragmentary view of the free end of the weft needle showing how a loop is formed in the weft thread on the underside for receiving the knitting needle.

Figure 1:
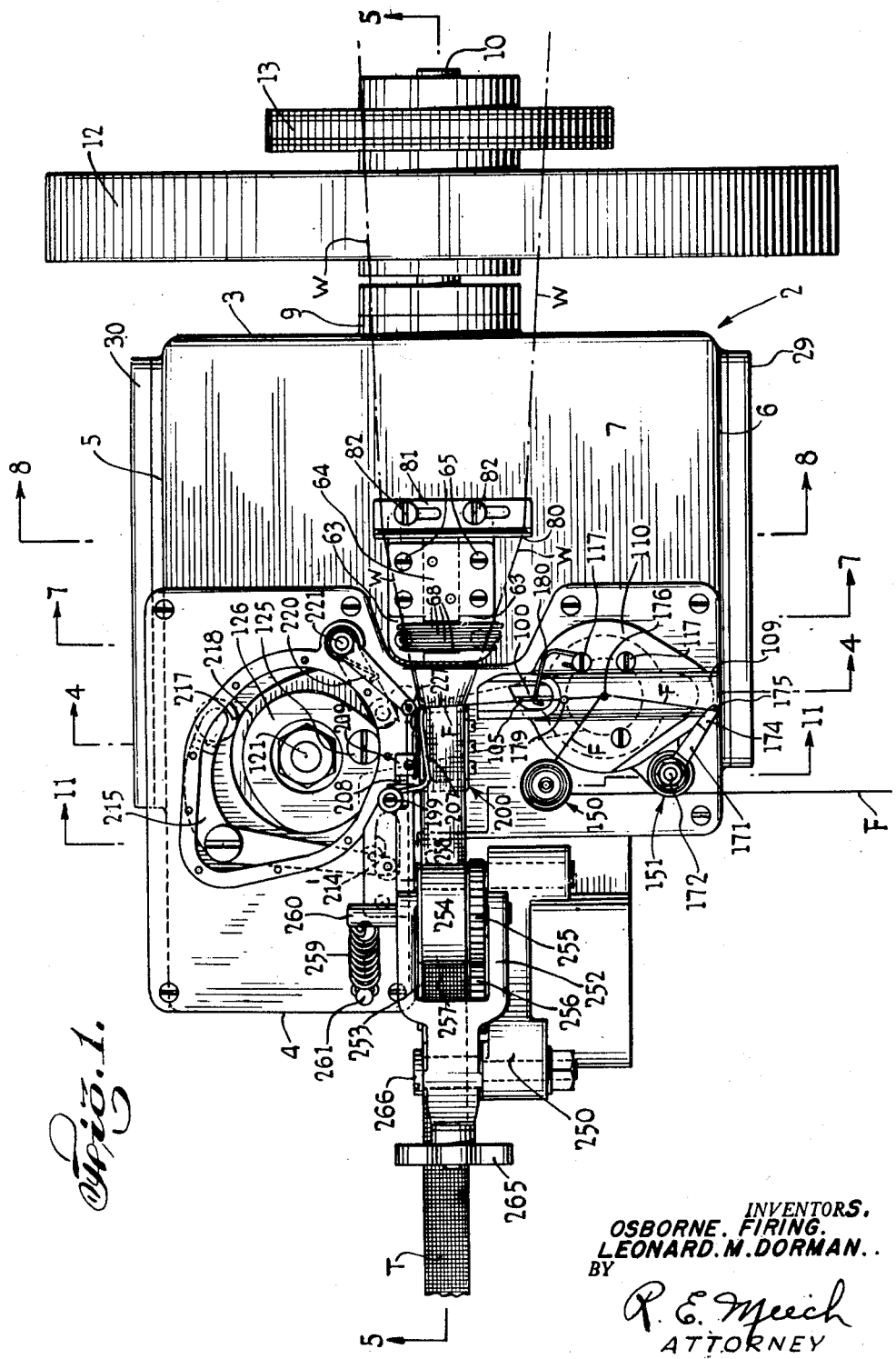
Fig. 1 is a plan view of the improved loom of our invention.

Referring more particularly to the drawings, the improved loom of our invention comprises a rectangular-shaped housing 2 having end walls 3 and 4, side walls 5 and 6, a top wall 7 and a bottom wall 8, which housing consists preferably of a steel casting. In the end wall 3, as more clearly shown in Figs. 5 and 6 of the drawings, there is suitably mounted a bearing 9 in which there is journalled a shaft 10. There is secured to the shaft 10 adjacent the outer end thereof, on the outer side of the housing, a flywheel 12 and a pulley 13 over which a belt is adapted to be disposed which is connected to a suitable source of power, such as a motor (not shown), for driving the shaft 10.

*Jack and heddle arrangement*

Within the housing 2, there is arranged two pairs of parallel shafts 14, 15, 16 and 17 with the shafts of each pair arranged one above the other and at a spaced distance from each other. On one end of each of the shafts 14, 15, 16 and 17 there is arranged a gear 19, 20, 21 and 22, respectively, with the gears 19 and 20 and the shafts 14 and 15 meshing with each other, and with the gears 21 and 22 on the shafts 16 and 17 meshing with each other. Both of the gears 19 and 21 on the lower shafts 14 and 16 also mesh with a gear 18 arranged on the inner end of the driveshaft 10. By such arrangement, it will be seen that the shaft 10 upon rotation will drive the shafts 14, 15, 16 and 17 through the action of the gears 18, 19, 20, 21 and 22. The shafts 14 to 17 are journalled in suitable bearings 24 and 26, respectively, which bearings are mounted in two pairs of brackets 27 and 28 with brackets of each pair being spaced from each other and carried by plates 29 and 30, respectively, mounted on the side walls 6 and 5, respectively, of the housing 2, by any suitable means, such as a series of machine screws 27a. Extending between the pair of brackets 27 at a spaced distance from each other, there is provided a pair of rods or shafts 31 and 32 which rods extend substantially parallel to each other and to the shafts 14 and 15. Directly below the shaft 14, there is arranged a plurality of horizontally extending spaced apart levers 33, four in the present instance, with one end of each of these levers being pivotally attached to the lower rod 31. On the opposite end of each of the levers 33, there is arranged a set of teeth 34 so as to provide a segmental gear arrangement, which teeth are provided for a purpose hereinafter to be described.

Above the shaft 15 there is arranged another series of horizontally disposed levers 35, four in the present instance, with the outer end of each of these levers being pivotally attached to the upper rod 32. On the inner end of each of the levers 35, there is arranged a set of teeth 36 similar to the teeth 34 of the levers 33. The levers 33 and 35 are staggered relative to each other for reasons to be explained. On the shaft 14 there is arranged a plurality of spaced apart cams 37 identical in number to the number of levers 33, with which they cooperate. On the shaft 15, there is mounted a plurality of similar spaced apart cams 38 identical in number to the number of levers 35 with which these cams cooperate. On each of the levers 33 there is mounted intermediate the length thereof, a roller 33a each of which acts as a cam follower for the respective cams 37 and on each of the levers 35, there is arranged a similar roller 35a which acts as a cam follower for the respective cams 38. Extending between each of the levers 33 and one of each of the levers 35, there is arranged vertically a tension coil spring 39 which acts to move these levers 33 and 35 toward each other about their pivotal connections with the rods 31 and 32, respectively. These springs 39 are provided for the purpose of maintaining the rollers 33a and 35a of the levers 33 and 35, respectively, in contact with their respective cams 37 and 38 carried by the shafts 14 and 15.

On the opposite side of the loom and the shaft 10, there is provided a similar arrangement of levers and cams. In such arrangement there is provided another pair of parallel rods or shafts 40 and 41, respectively, which extend between the pair of brackets 28. Below the shaft 16 on this side of the loom, there is arranged a plurality of levers 42, four in the present instance, with one end of each of them being pivotally attached to the rod 40. On the opposite or inner end of each of the levers 42 there is provided a set of teeth 43 so as to provide a segmental gear arrangement. On the shaft 16 there is arranged a plurality of spaced apart cams 44, similar in number to the number of levers 42 with which they cooperate. Above the shaft 17 there is arranged another series of levers 45, four in the present instance, with one end of each of these levers being pivotally attached to the rod 41 and on the opposite end of each of these levers there is provided a similar set of teeth 46. On the shaft 17 there is mounted a plurality of spaced apart cams 47 similar in number to the number of levers 45 with which these cams cooperate. Intermediate the length of each of the levers 42 there is mounted thereon a roller 42a which acts as a cam follower for the respective cams 44, and on each of the levers 45 there is mounted a similar roller 45a which acts as a cam follower for the respective cams 47. Between each of the levers 42 and one of each of the levers 45 positioned thereabove, there is arranged vertically, a tension spring 48 similar to the tension spring 39 and disposed substantially parallel thereto, with the ends of these springs being attached to the respective levers. It is the purpose of these springs 48 to maintain the rollers 42a and 45a of the levers 42 and 45 in contact with their respective cams 44 and 47 of the shafts 16 and 17, respectively. It will be understood that the levers of each group of levers 33, 35, 42 and 45 are staggered relative to the levers of each other group. In other words, the levers of one group are not positioned directly above or opposite the levers of any other group. Such an arrangement permits the drive levers, together with cams for driving the same, to be positioned relatively close together.

As more clearly shown in Figs. 5 and 7, centrally of the loom between the pairs of shafts 14, 15 and 16, 17, there is arranged vertically within the housing 2, a plurality of elongated relatively thin bar-like jacks 50, four being shown in the drawings, which extend down to a point below the lowermost levers 33 and 42. The jacks are positioned in alignment with and disposed directly next to and in slidable engagement with each other. Adjacent both the top and bottom of each of the jacks, there is provided a thickened portion 51 having opposed flat surfaces 52 which act as slidable bearing surfaces for the jacks as they reciprocate and slide over one another in side by side relation when the loom is in operation.

Adjacent the lower end of the first and every fourth jack 50 thereafter, there is arranged in one edge thereof, a set of teeth 53 which cooperate and mesh with the teeth 34 in the end of the respective levers 33. On the opposite side of the second jack and every fourth jack thereafter, there is arranged in the edge thereof adjacent the top, a similar set of teeth 54 which cooperate and mesh with the teeth 46 in the end of the respective levers 45. Again adjacent the bottom of the third jack and every fourth jack thereafter, there is arranged in that edge thereof opposite the side in which the teeth 53 are arranged, another similar set of teeth 55 which cooperate and mesh with the set of teeth 43 in the end of the respective levers 42. There is likewise arranged in the fourth and every fourth jack thereafter in the edge thereof opposite that side in which the set of teeth 54 in the second jack are located, another similar set of teeth 56 which cooperate and mesh with the teeth in the end of the respective levers 35.

Adjacent the lower end of each jack 50 there is arranged therethrough an eye 57 to which one end of a tension coil spring 58 is attached with the opposite end of each of these springs being suitably attached, as at 59, to the inside walls 5 and 6 of the housing. It is the purpose of these springs to maintain the teeth in the edges of the jacks in mesh with the teeth of the respective levers and to prevent any lost motion or backlash of the jacks and levers.

The lower portions of the jacks 50 are reciprocably mounted in a rectangular-shaped recess 60 of a horizontal guide member 61 in the form of a bar which is secured to and preferably bridges the pair of brackets 28. The upper portions of the jacks likewise extend through an opening 62a in the top 7 of the housing and through a rectangular-shaped opening 62 in a guide block or member 63 mounted on top of the housing. On top of the member 63 there is positioned an adjustable or removable plate 64 secured thereto by means of machine screws 65. It is the purpose of this plate to alter the size of the opening 62 through the member 63 in accordance with the number of jacks adapted to be disposed therein or used for any particular weave. In the present instance, there is shown only four jacks which is all that is required to produce a fabric of a conventional weave. It will be understood, however, that as many as sixteen jacks can be used, if desired, to obtain any desired weave, there being provided sufficient levers and cams, namely, sixteen of each for driving such a number of jacks. In using four jacks as in the present case, it will be seen that only a corresponding number, namely, four of the levers and cams are used. In case it is desired to use sixteen jacks, the plate 64 is entirely removed, the opening 62 in the member 63 having such dimensions to accommodate such a number of jacks and in case a fewer number of jacks is used, the plate 64 is adjusted so that the size of the opening 62 is just large enough to accommodate the number of jacks being used. By providing such a jack construction and arrangement, together with the driving means therefor, it will be seen that the overall space occupied by the jacks is confined to a minimum.

As more clearly shown in Figs. 18 through 22 of the drawings, there is positioned on the upper end of each of the jacks 50 and secured thereto, a pair of spaced apart horizontally disposed parallel plates 66 which extend substantially perpendicular to the jacks. There is arranged adjacent each end of the plates 66 a pin 67 which extends therebetween. There is provided a plurality of inverted U-shaped harness or heddle frames 68 preferably made from a piece of inherently resilient wire or narrow flat metallic strip, with each of these frames adapted to be attached to one of the jacks 50. In the free end of each of the leg or side portions of each of the frames 68, there is arranged a hook-shaped portion 69 which portions are disposed between the plates 66 and in engagement with the pins 67 extending therebetween. In other words, the hook-shaped portions 69 due to the resiliency of the frame, may be conveniently snapped into position on the end of the jacks with the hook-shaped portions 69 disposed on the inner sides of the respective pins 67, with the leg or side portions tending to spring outwardly away from each other so as to bring the hook-shaped portions carried thereby, into engagement with the respective pins 67. In each of the heddle frames 68, there is arranged a pair of spaced apart horizontally disposed heddle bars 70 and 71 with one of these heddle bars arranged adjacent the top of the frame and the other arranged adjacent the bottom thereof. These bars extend through elongated aligned openings arranged in the respective sides of the frame. On one end of each of the bars 70 and 71, there is arranged an enlarged or deformed portion 72 and 73, respectively, so as to prevent these ends of the bars from passing through the openings in the frame. On the opposite ends of the bars 70 and 71 there are arranged hook-shaped portions 74 and 75, respectively, with the respective hook-shaped portions facing each other. These heddle bars 70 and 71 are mounted in the frames by inserting them through the openings in one side thereof and through the openings in the opposite side thereof with the respective enlarged or deformed portions 72 and 73 preventing the bars from passing all the way through the openings. In such position, the hook-shaped portions 74 and 75 on the opposite ends of these bars will be positioned on the outer side of the opposite side of the frame. Between the hook-shaped portions 74 and 75 of the bars 70 and 71, respectively, there is disposed an inherently resilient vertically disposed retaining member 76 which is slotted at each end so as to provide forked end portions 76a which are adapted to fit in and cooperate with the respective hook-shaped portions 74 and 75 to lock the bars 70 and 71 in the frame. There is arranged in each frame 68, a plurality of heddles 77, preferably formed from relatively flat thin resilient metallic stock. Adjacent each end of each of the heddles 77, there is arranged therethrough a rectangular-shaped aperture 78, which apertures are slightly larger than the cross-section of the bars 70 and 71 with which they cooperate. The heddles 77 are threaded on and positioned slidably on the heddle bars 70 and 71 with the heddle bars passing through the respective openings in the ends of the heddles. In other words, the heddles 77 are constructed and arranged so that they are movable horizontally relative to the bars 70 and 71 and their respective frames. Centrally of each of the heddles 77, there is formed therein, an eye 79 through which a warp thread is adapted to be threaded, and passes in a manner hereinafter to be described.

It will be seen that the heddles 77 are disposed loosely within the frame between the sides thereof and that the retaining member 76 is disposed between the hook-shaped ends 74 and 75 of the heddle members 70 and 71, respectively, on the outer side of the frame and that the heddles are prevented from becoming displaced from the heddle bars due to the provision of this spring retaining member 76. If it is desired to replace or remove any of the heddles from the heddle bars, the retaining member 76 is removed from its locking engagement with the hook-shaped portions of the horizontal bars merely by springing it outwardly from the side of the frame and removing it from the hook-shaped portions of the bars. It will be seen then that the horizontal bars 70 and 71 can then be moved laterally through the openings in the sides of the heddle frame, thereby permitting replacement or removal of the heddles. After the required number of heddles have been replaced or removed from the bars, the bars are reinserted in their respective openings in the sides of the frame and the retaining member 76 is again positioned so as to engage the respective hook-shaped portions 74 and 75 of the heddle bars merely by springing it into place so as again to lock the heddle bars 70 and 71 in position in the heddle frame. As shown in Figs. 1 and 23 it will be seen that these heddle frames 68 are graduated in size from the first to the last heddle frame for the purpose of permitting the warp threads to pass conveniently from the creel or other source of supply. In other words, the distance between the sides of each frame is less than the distance between the sides of the next succeeding frame throughout the series of frames so that the distance between the sides of the frames converges toward the first heddle so as to gradually confine all of the warp threads as they pass into the loom.

There is arranged at a spaced distance rearwardly of the heddle frames 68 a stationary reed 80 through which the warp threads pass from the source of supply for keeping them separated before they pass through the heddles 77. This reed 80 is mounted preferably on a bracket 81 which is secured preferably to the outer end of the guide block 63 by means of machine screws 82.

Filler or weft needle arrangement

As more clearly shown in Figs. 1 and 12 through 15 of the drawings, there is arranged on top of the housing 2 to one side of the center of the loom and the jack and heddle arrangement, an elongated filler finger or weft needle 100 for the purpose of projecting loops of the weft thread through the shed of the warps in a manner to be described. This needle is relatively thin and flat and relatively wide so as to be substantially blade-like in form. The outer or free end of the needle is preferably relieved so as to provide a tapered end as at 101 with the upper surface bevelled so as to provide a blunt pointed end 102. Toward the forward edge 104 of the needle, the tapered end 101 terminates in a tapered portion 101a which is tapered to a greater degree than tapered portion 101, and which tends to wipe the filler thread into the fell of the fabric when the needle is retracted. In the opposed faces of this needle there are arranged directly opposite each other, longitudinally extending ledges or channels 103 which are positioned preferably a slight distance rearwardly from the forward edge 104 of the needle so as to provide a shelf-like portion therealong. The needle 100 is preferably tapered transversely, as shown in Fig. 14a, from the gear side of the channel 103 to the rear edge thereof with that portion of the needle extending from the channel 103 to the forward edge thereof being relatively thin and flat so as to provide a needle of a blade-like construction. Adjacent the outer or free end of the needle, there is arranged therethrough in alignment with the channels or ledges 103 therein, an eye 105 through which the weft thread is adapted to pass.

The inner end of the needle 100 is secured to a reciprocating member or needle slide 106 preferably by means of a pair of machine screws 107. The extreme outer portion 108 of the reciproating member 106 preferably is cylindrical in shape so as to provide a piston-like portion which is slidably arranged in a cylinder-like portion 109 of an oscillating member 110. This oscillating member 109 is mounted in a suitable bearing 112 arranged in the top 7 of the housing and is connected by means of screws 116 to a flange 113 arranged on the upper end of a vertically extending shaft 114 which, in turn, is journalled in a suitable bearing 115 carried by the arm of a bracket 117 arranged within the housing and which is a part thereof.

As shown in Figs. 4 and 11 of the drawings, below the bracket 117, there is arranged a lever 118 having one end thereof securely attached to the lower end of the shaft 114. On the opposite end of the lever 118, there is suitably mounted a rotatable roller 119 which acts as a cam follower and cooperates with a cam 120 positioned on a vertically arranged shaft 121 for the purpose of oscillating the member 110 for a purpose and in a manner to be described. To one side of the lever 118, as more clearly shown in Figs. 5 and 11, there is arranged preferably a tension coil spring 127 having one end thereof connected to the lever with the opposite end connected to the end of a pin 128 carried by the bracket 117. It is the purpose of this spring to maintain at all times, the roller 119 in contact with the cam 120.

Centrally of the member 110, there is provided in the bottom thereof in cooperation with the flange 113 of the shaft 114, an elongated recess or slot 122 in which there is movably positioned, a pin 123 threadedly connected to the needle slide 106 at the lower side thereof. There is arranged within the housing, a connecting rod 124 with one end thereof extending into the slot 122 and pivotally connected as at 133 to the pin 123 therein. The opposite end of the connecting rod 124 is pivotally connected to a pin 125 carried by a combined crank and cam 126 which, in turn, is secured to the shaft 121. By means of such arrangement the knife slide 106 together with the knife 100 carried thereby, is reciprocated relative to the oscillating member 110.

The vertical shaft 121 is positioned adjacent one end of the horizontal shaft 16 perpendicular thereto and is journalled in suitable bearings 129 carried by the bracket 117. On the lower end of the shaft 121 there is securely mounted thereon, a bevel gear 130 which meshes with a gear 131 mounted on an extension of the shaft 16 whereby the shaft 121 is driven by this shaft through action of the gears 21 and 18 when the loom is in operation.

Weft tension and measuring

Attention is now directed more particularly to Fig. 11 of the drawings in which there is shown a weft thread tension device generally designated at 150 and a weft thread pay-off or measuring means, generally designated 151 for measuring and paying-off the weft thread to the needle 100, in a manner to be described. The tension device comprises an elongated vertically arranged stem-like exteriorly threaded member 152 which is screwed into an extending portion 153 arranged in the top 7 of the housing to one side of the oscillating member 110 and extends into the housing. On the upper end of the member 152 there is provided an exteriorly threaded reduced portion 154 on which there is mounted for movement relative thereto, two pairs of circular resilient plates or disks 155, 156 which are disposed one on top of the other, having a hole arranged centrally thereof through which the reduced end 154 of the member 152 extends. There is arranged in the reduced portion 154, a diametrical slot 188 in which a diametrical center portion of the uppermost plate 156 is disposed. The lowermost plate of the pair of plates 155 rests upon a lock nut 156a threaded on to the exteriorly threaded portion of the member 152. Above the pair of plates 155, 156 and in contact with the uppermost plate thereof, there is provided a frusto-conical-shaped compression coil spring 157 which is disposed around the reduced portion 154. Above the spring 157 there is arranged on the threaded portion of the reduced portion 154, an adjustable nut 158 for the purpose of varying the compression of the spring 157 on the top of the disk 156. The spring 157 applies pressure to the pair of plates 156 which, in turn, are forced toward the pair of plates 155 and it will be seen by providing such an arrangement, that tension is applied to the weft thread when it is disposed between the opposed plates of the pair of plates 155 and 156.

There is arranged axially of the member 152, a longitudinally extending opening 159 in which there is reciprocably arranged an elongated pin or plunger 160 with one end thereof adapted to contact the diametrical portion of the uppermost plate of the pair of plates 156, which is disposed in the diametrical slot 188 of the reduced end portion 154. The opposite end of the plunger 160 extends into the housing and rests upon a projection 161 of a bell crank 162 which is pivotally attached as at 163 to the bracket 117. There is provided a link 164 having one end thereof pivotally connected to the bell crank 162 as at 165, with the opposite end pivotally connected as at 166 to another bell crank 167 which, in turn, is pivotally connected to the bracket 117, as at 168. There is carried by the bell crank 167, a rotatable roller 169 which is maintained in contact with a cam 170 securely arranged on the shaft 121. Upon rotation of the shaft 121, it will be seen that the plunger 160 is adapted to be reciprocated in a vertical plane through the action of the roller 169, the bell cranks 167 and 162 and the link 164. Upon movement of the plunger 160 it will be seen that the upper end thereof moves the uppermost plate 156 upwardly away from the pair of plates 155 so as to provide sufficient clearance between the plates 155 and 156 for free passage of the weft thread therebetween.

At a predetermined spaced distance from the tension device 150 and from the eye 105 in the end of the needle 100, there is arranged the weft pay-off mechanism or measuring means 151, which is positioned on the same side of the oscillating member 110 as the tension device 150. This pay-off mechanism comprises an oscillating angular arm 171 having one end thereof securely attached to a stud shaft 172 arranged in a suitable bearing 173 in the top of the housing. The opposite or free end of the arm 171 is offset as at 174 so as to be disposed above the cylindrical portion 109 of the oscillating member 110. There is arranged in this offset or free end portion, an eye 175 through which the weft thread passes from the tension device 150 to the eye 105 in the end of the needle 100.

On top of the cylindrical portion 109 of the oscillating member, there is arranged between the arm 171 and the eye in the needle and the tension device 150, a member 176 having eyes 177 and 178 arranged therethrough one above the other through which the weft thread passes. Inwardly of the member 176 there is arranged on top of the cylindrical portion 109, another member 179 having an eye therein also through which the weft thread passes, which eye is substantially in alignment with the eye 105 in the end of the needle 100. On the oscillating member 110 at a point beyond the member 179, there is arranged preferably a finger-like guide member 180 in the form of a wire which is adapted to aid in maintaining the weft thread in the upper channel or ledge 103 of the needle.

On the lower end of the stud shaft 172 there is secured thereto an arm 181 to which one end of a reciprocating rod 182 is pivotally attached as at 183 and which is arranged in a suitable bearing in the bracket 117 within the housing. On the opposite end of the rod 182 there is rotatably mounted a roller 184 which contacts the cam 185 arranged on the shaft 121. The end of the rod is also preferably attached to a yoke-like lever member 189 at the pivotal connection or axis of the roller 184 as at 190, which member in turn is pivotally attached to the bracket 117 as at 191. It is the purpose of this member to support and guide the inner end of the rod 182. Intermediate the length of the rod 182 there is arranged thereon, an adjustable collar 186 and between this collar and an adjacent side of the bracket 117 there is arranged around the rod 182, a compression coil spring 187 which maintains the roller 184 in contact with the cam 185 at all times.

*Knitting needle assembly*

As shown in Figs. 1, 5, 9, 11, 16 and 23 of the drawings, there is arranged centrally of the top of the housing to one side of the needle 100 and its assembly, and at a relatively short distance from the heddles 77, a tape or fabric breast plate 200, which is secured to the housing preferably by machine screws 201 and positioned thereon by a tongue-in-groove arrangement 202. This breast plate comprises a block-like member having an arcuate upper surface 203 arranged centrally thereof, with upwardly extending sides or flanges 204 and 205. The tape or fabric after it is woven is adapted to lie on and pass over the arcuate surface 203 and it is the purpose of the edges 204, 205 to guide the outermost warp threads and confine the same on the breast plate at the fell of the fabric with such fell being disposed at the inner edge 206 of the breast plate. Above the breast plate and to one side thereof, there is attached to a screw 199, a finger-like guide member 207 in the form of a wire which lies upon the breast plate adjacent the inner end thereof and directly next to the flange or side 204 adjacent thereto and is provided for the purpose of maintaining the edge of the woven fabric against the inner side of the flange 204. If desired, however, a hold-down member in the form of a plate extending over the breast plate in contact with the tape, may be provided for maintaining the warps in position on the breast plate.

On the side of the breast plate 200 opposite that of the needle 100, and on the opposite side of the shed formed by the warps, there is mounted an elongated reciprocating member 208 having arranged on one end thereof, clamping means 209 in which a knitting needle 210 preferably of the beard type, is removably secured. Intermediate the length of the member 208, there is secured thereto, a yoke-like member 211 having a bifurcated end 212 in which the upper end of a drive pin 213 is positioned. The pin 213 extends through a slotted opening 214 in the top of the housing and is securely attached to a bell crank 215 arranged within the housing. The bell crank 215 is pivotally attached to the bracket 117 by means of a pin 216 and there is arranged on one leg of this bell crank, a roller 217 which contacts a cam 218 securely arranged on the shaft 121. There is provided a tension spring 219 having one end thereof connected to the other leg of the bell crank 215 and with the opposite end connected to the inner side of the housing. It is the purpose of this spring to maintain the roller 217 in contact with the cam 218. By such an arrangement, it will be seen that the member 208 together with the knitting needle 210 carried thereby, is reciprocated by the action of the cam 218, the roller 217 and the bell crank 215 in a plane substantially perpendicular to the front edge 206 of the flange 204 with the needle disposed directly next to the outer side of the breast plate.

At a point to one side of the heddle arrangement on the same side of the loom as the knitting needle 210, there is arranged an oscillating lever 220 having one end thereof attached to a vertical shaft 221 positioned in a suitable bearing in the top of the housing. This shaft extends into the housing and there is arranged on the inner end thereof another lever 222 on the free end of which there is rotatably disposed a roller 223 which cooperates with and contacts the cam of the combined cam and crank 126. Above the lever 222 there is arranged around the shaft 221, a coil spring 224 having one end thereof attached to the under side of the top of the housing at 225 with the other end engaging the lever 222 as at 226. It is the purpose of this spring to maintain the roller 223 in contact with the cam 126.

On the free end of the lever 220 arranged on the shaft 221 above the top of the housing, there is mounted a roller 227, preferably arranged for eccentric adjustment relative to the end of the lever. By this arrangement, it will be seen that the lever 220 is oscillated in a relatively small arc so as to move this arm toward and away from the side of the shed. The roller on the end of this lever cooperates with the beard 228 of the knitting needle 210 in its reciprocating movement and it is the purpose of this roller to close intermittently the beard so as to provide a closed loop in the end of the needle in one position thereof.

*Tape or warp pull-up*

As more clearly shown in Figs. 1, 2, 3 and 5 of the drawings, there is arranged on top of the housing adjacent the rear side 4 thereof, an angularly extending bracket 250 to which there is pivotally attached as at 266, an inverted substantially J-shaped member 251. The upper end 252 of the member 251 extends over the top of the loom and is positioned at a spaced distance thereabove and is preferably bifurcated as at 253, with a friction roller 254 rotatably disposed in this bifurcated end. There is arranged around the periphery of this roller 254, preferably an abrasive in the form of emery cloth for the purpose of preventing slippage of the woven fabric relative thereto. There is arranged with this roller 254 to one side thereof, a gear 255 which meshes with a similar gear 256 arranged with a roller 257 positioned therebelow on a shaft 267 positioned on top of the housing. The roller 257 is similar to the roller 254, but preferably slightly larger in diameter. The gear 256 likewise is slightly larger than the gear 255 so that the roller 254 will travel at a faster speed than the roller 257 for a purpose hereinafter to be described. Immediately below and rearwardly of the roll 254, there is suitably arranged in the top of the housing a rod or bar member 258 around which the fabric is adapted to pass before passing to the roller 254.

To one side of the member 251, there is arranged a tension spring 259 having one end thereof attached to a pin 260 projecting outwardly from the upper end 252 of the member 251 with the opposite end of the spring suitably attached to the top of the housing as at 261. It is the purpose of this spring to swing the member 251 about its pivotal connection at 266 so as to maintain and move the rollers 254 and 257 toward each other. The other leg 263 of the member 251 extends downwardly along the outer edge of the rear wall 4 of the housing and there is arranged in the end thereof a screw 264 having a nut-like handle 265 disposed on the outer end thereof with the inner end of the screw 264 adapted to cooperate with a stop portion 268 arranged on the outer side 4 of the housing. It is the purpose of this adjusting screw 264 to move the member 251 about its pivotal connection at 266 so as to adjust the position of the roller 254 carried thereby relative to the opposed roller 257 with which it cooperates, whereby the clearance therebetween can be varied.

In an offset portion of the side wall 6 of the housing, there is secured to the end of the shaft 267, upon which the roller 257 and the gear 256 are mounted, a sprocket wheel 270 around which there is disposed a chain 271, the chain also passing over and around a sprocket wheel 272 positioned at a spaced distance below the sprocket 270, which sprocket 272 is rotatably arranged on a stud shaft 273 mounted in the side wall of the housing. Between the two sprockets 272 and 270 there is pivotally mounted on the side of the housing as at 274, an adjustable lever 275 having a small idler sprocket 276 rotatably arranged in the free end thereof and disposed on the outer side of the chain 271 with which it is adapted to cooperate to maintain the chain 271 under the proper tension over the sprockets 270 and 272, thereby preventing any clattering of the chain. There is also arranged on the shaft 273 and secured to the sprocket 272 thereon, a gear 277 which is part of a compound gearing arrangement positioned therebelow. This compound gearing or gear train comprises a gear 278 having a smaller gear 286 arranged directly next to and attached thereto, both gears being rotatably mounted on the free end of an adjustable lever-like member 279 with the gear 286 meshing with the gear 277. In the opposite end of the member 279 there is arranged, a longitudinally extending slot 280 in which there is disposed a screw 281 for securing the member 279 adjustably to the side of the housing. Below the gear 278 there is arranged on the end of a rotatable shaft 282 which extends into the housing and is suitably journalled in the side 6 thereof, another gear 283 which meshes with the gear 278. There is arranged on the opposite end of the shaft 282 within the housing, another gear 284, which meshes with a worm gear 285 positioned on the extension of the shaft 16.

Thus, it will be seen that the roller 257 is driven by the chain 271 and the compound gearing 277, 278, 286, 283 and the gears 284 and 285 when the shaft 16 is rotated by means of the drive shaft 10. Upon rotation of the shaft 267 upon which the gear 256 is mounted, together with the roller 257, it will be seen that the roller 254 is also rotated due to the meshing of the gears 255 and 256. It will be understood that the speed of the rollers 254 and 257 controls the number of picks per inch in the finished fabric due to the fact that these rollers pull the fabric or warps through the loom and consequently the greater the speed of these rollers, the fewer picks per inch will result in the finished fabric, and, conversely, the lesser the speed of these rollers, the greater the number of picks. It is the purpose of the compound gearing to vary, as desired, the speed of the rollers 254 and 257 and, consequently, the number of picks per inch in the woven fabric or tape. It will be understood that the speed of these rollers can be varied by merely changing the size of the respective gears 278 and 286. For example, if it is desired to have a large number of picks per inch in the finished fabric, a gear 286 having a relatively small diameter is provided whereby the rollers 254 and 257 are driven at a greater speed than if a larger gear were used.

*Operation*

Figure 2:
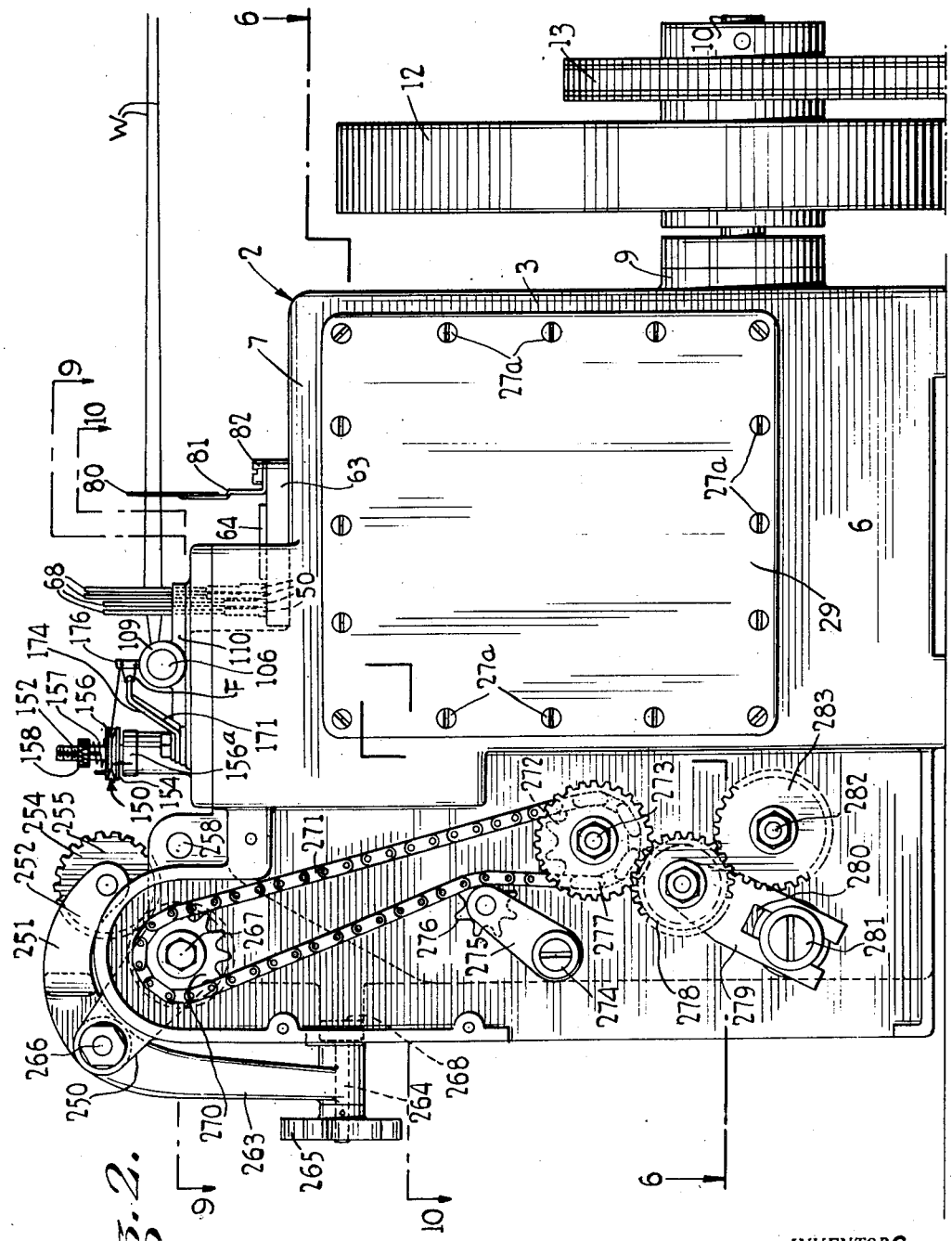
Fig. 2 is a side elevational view thereof.

The warp threads W are positioned in the loom by threading them from a creel (not shown) or other suitable source of supply, through the reed 80, as shown in Figs. 1, 2 and 5 of the drawings, through the eyes 79 in the heddles 77 of the heddle frames 68 which are carried by the jacks 50, as shown in Figs. 16, 23, 25 and 27, over the breast plate 200, in under the stationary rod 258, and up and around the roller 254, and down between the latter roll and the opposed roller 257 of the warp or tape pull-up mechanism and out of the loom. The warps are tensioned at all times while passing into the loom by any suitable means (not shown) so as to keep them relatively taut. In the present instance, as shown in Figs. 23, 24 and 26, fifty-nine warp threads are shown for weaving a tape 25/32 of an inch in width, but it will be understood that a greater number or a fewer number of warps may be used depending upon the width of the tape or fabric desired to be woven and the weight, thickness and type of weave thereof. Also, in the present case, four jacks and heddles 68 are shown to obtain the desired weave, but it will be understood, as hereinbefore described, that any number of jacks and heddles up to and including sixteen may be used depending upon the type of weave desired.

The weft or filler thread F is then positioned in the loom by threading it from a bobbin (not shown) or other suitable source of supply, around and through the tensioning device 150, as shown in Figs. 1, 2 and 11 of the drawings, through the eye 177 in the post or member 176, through the eye 175 in the end of the oscillating arm 171, back through the eye 178 in the post 176, through the eye in the post or member 179, then in under the wire guide member 180, and thence along the ledge 103 on the upper side of the filler finger or weft needle 100, down through the eye 105 in the end thereof, then back along the ledge 103 on the underside of the needle 100 to the side of the warp threads W.

After the warp and weft threads have been threaded and positioned in the loom as above described, the loom is in readiness for the weaving operation. The main drive shaft 10 is then set in rotation by any suitable source of power, such as a motor (not shown), through the action of a belt and pulley 13 which is attached to the shaft 10, as shown in Figs. 1, 5 and 6. Upon rotation of this shaft, it will be seen that the shafts 14, 15, 16 and 17 will be driven rotatively through the action of gears 19, 20, 21 and 22, respectively attached thereto, and the gear 18 carried by the shaft 10. As the shafts 14 through 17 are rotated, the jacks 50, together with the heddles 68 carried thereby, are reciprocated vertically through the action of the cams 37, 38, 44 and 47 respectively carried by these shafts, the rollers 33a, 35a, 42a and 45a carried by the respective pivotally mounted levers 33, 35, 42 and 45 with the teeth carried by these levers cooperating with jacks 50 to drive the same, as clearly shown in Figs. 6 and 7 of the drawings.

As shown in Figs. 4, 5 and 6 of the drawings, the shaft 16 drives the vertical shaft 121 through the action of the gears 130 and 131, and the member 110 and the shaft 114 to which it is connected is oscillated by the action of the lever 118, roller 119 carried thereby and the cam 120 mounted on the shaft 121, as shown in Figs. 9, 10, 11 and 12. The weft needle 100, together with the slidable member 106 on which it is mounted, is driven reciprocally by means of the rod 124 and the cam or eccentric 126 which is mounted on the upper end of the shaft 121. The tensioning device 150 is actuated by means of the vertical rod 160, the bell cranks 162 and 167, the lever 164, and the roller 169 which cooperates with the cam 170 mounted on the shaft 121. The weft thread pay-off or measuring means 151 is driven by means of the shaft 172, the crank arm 181, the reciprocating rod 182, the spring 187, and the roller 184 which cooperates with the cam 185 carried by the shaft 121. The knitting needle 210, together with the member 208 on which it is mounted, is reciprocated by the action of bell crank 215, the spring 219 and the roller 211 which cooperates with the cam 218 mounted on the shaft 121. The oscillating lever 220 for closing the beard 228 of the knitting needle 210 is actuated by means of the shaft 221, the lever 222 and the roller 223 carried thereby which cooperates with the cam 126 carried by the shaft 121.

As shown in Figs. 2, 3, 5 and 6, the warp take-up rollers 254 and 257 are driven by the action of the respective gears 255 and 256, the sprockets 270 and 272 around which the chain 271 is disposed, the compound gearing 277, 278 and 283, the shaft 282 on which the latter gear is mounted, the gear 284 which is also mounted on shaft 282, and the gear 285 which is mounted on an extension of the shaft 116. It will be understood that all of these mechanisms, as above described, are actuated in timed relation with each other.

Having described how all of the various mechanisms of our improved loom are actuated, the actual weaving operation will now be described. As the jacks 50 are actuated, as shown in Figs. 16, 25 and 27 of the drawings, half of the warp threads W are moved upwardly, and the other half are moved downwardly to form a shed between the warp threads for receiving the weft or filler thread. In the present instance, alternate warp threads are moved up and down alternately in order to obtain a conventional type of weave, and it is necessary to provide only four jacks and heddles, as shown, to obtain such a weave.

After the shed is formed between the warps, the weft or filler thread F is projected through the shed by means of the filler finger or needle 100, as shown most clearly in Figs. 23, 24 and 25 of the drawings. The needle is moved, by the oscillating action of the member 110, in an arcuate path through the shed until the forward edge 104 thereof approaches the edge of the breast plate 200 and moves into the fell of the fabric, at which point is beats up or moves the previous pick of the weft into the fell, throughout the entire width of the fabric, as clearly shown in Fig. 24. As has been explained, the member 110 is actuated by the cam or eccentric 126 on the shaft 121 and this cam is so constructed and arranged that the velocity of the filler needle is at a minimum when the forward edge thereof is disposed in its furthermost position in the fell of the fabric or, in other words, in its beating up position. At this point it will be seen from Fig. 24, that the end of the needle has been projected through to the opposite side of the warp and, consequently, the weft thread F has been carried through the shed of the warp thereby so as to provide a loop of the continuous weft thread F in the shed. The filler needle then moves away from the breast plate 200 and out of the fell of the fabric and is retracted from the shed in substantially a straight line path at a small angle to the fell, as shown in Figs. 23 and 26. As the filler needle is being projected into the shed, the jacks 50, together with the heddles carried thereby, are actuated so that the shed has started to change for the next pick and the shed is substantially half changed when the needle has reached its furthermost projected position in the shed, as shown in Fig. 24, and the shed has been completely changed by the time the needle or finger 100 has moved substantially one-third the distance of its travel in its retracted movement out of the shed. That is, the shed is changed while the finger or needle is disposed between the warps and this is one of the most important aspects of our invention. By such arrangement, it will be seen that the warp threads provide a scissors action on the weft needle, as shown in Figs. 25 and 27, and by such action, the warps maintain the filler thread F on the ledges 103 of the filler needle 100 while the needle is positioned in the shed. It is the purpose of these ledges 103 on the top and bottom of the needle to hold and lay the loop of weft thread next to the fell of the fabric, and to prevent the weft from being rolled or displaced over the top and bottom of the filler needle.

After the filler needle 100 has been projected through the shed, and moved a slight distance in its retracted movement, a loop L is formed in the weft thread F on the underside of the needle adjacent the outer end thereof between the outermost warp thread and the eye 105 in the end of the needle, as clearly shown in Fig. 28 of the drawings. This loop L is formed by the action of oscillating arm 171 of the weft pay-off mechanism 151 in a manner now to be described. It will be understood that this pay-off or measuring mechanism provides or measures just sufficient weft thread to the needle 100 for one pick or loop of the weft thread through the shed, and that when the filler needle starts its retracted movement, a loop of weft thread ordinarily would be formed through the eye 105 on the outer sides of the warp extending both above and below the needle. However, the arm 171 is actuated by the cam 185 just sufficiently to take in part of the filler thread so as to eliminate or prevent a loop therein from forming on the upper side of the needle with the filler thread lying on the ledge 103 flat against the upperside of the needle but permits the loop L to form on the lower side thereof, as shown in Fig. 28. It will be seen that this loop is maintained in the filler thread due to the scissors action of the warps due to the fact that the shed has already been half changed.

At this point the knitting needle 210 is actuated and projected into and through the loop L formed in the filler thread F as above described, and the filler thread is looped on the knitting needle, as shown in Fig. 26, with the loop of the previous pick moving up over the shank of the needle. As the knitting needle is moved in the opposite direction or retracted, the beard or hooked-end catches the loop of filler thread and as it continues in its movement, the looped end is finally disposed in the hooked-end portion of the knitting needle, and as the knitting needle is further moved toward its retracted position, the beard 228 is closed by the action of the cam roller 227 carried by the arm 220 so that the looped end of the previous pick of the weft thread passes over the beard 228 and off the end of the needle in a manner well known to those skilled in the art, thereby providing a knitted selvage along this edge of the fabric being woven. The knitting needle then continues to move to its fully retracted position, as shown in Fig. 24, and the loop of the weft thread F is disposed in the hooked portion thereof and remains disposed thereon until the next cycle of the loom, at which time it will be removed therefrom by the beard 228 on the next successive pick, as above described. In such fully retracted movement of the knitting needle, it will be seen that the looped portion of the filler thread F disposed in the shed has been moved to position into the fell of the fabric. After the filler needle 100 has started to move toward its retracted position out of the shed, it also moves toward the fell of the fabric and in a path substantially parallel thereto so as to move the filler thread into the fell. It will be seen, as shown diagrammatically in the broken lines of Fig. 23, that the filler needle 100 moves within the shed in a relatively small curved path substantially in the form of a figure 8, thereby permitting the heddles 68 to be positioned relatively close to the fell of the fabric being woven and this is another important aspect of the present invention. After the weft needle has been completely retracted from the shed, it will be understood that the shed has been changed, as described, and is in readiness for receiving the next pick of the weft thread. It will be seen that the warp threads W gradually snap to position out of contact with the filler needle 100 to form the shed for the next pick as the needle moves to its retracted position.

As the weft needle is being retracted, the looped portion or pick of the filler thread disposed in the shed is prevented from passing out of the shed with the movement of the needle due to the fact that it is looped around the end of the knitting needle 210. Upon such retractive movement of the filler needle 100, the tensioning device 150 is actuated by the rod 160 and cam 170 to relieve the tension on weft or filler thread so that it will pay off from its source. The oscillating arm 171 is actuated during such retractive movement of the filler needle, and draws from the source of supply through the tensioning device 150 sufficient filler thread for the next pick, i. e., sufficient thread for a loop of the filler thread through the warps. After such predetermined amount of filler thread is drawn from the source of supply, the tensioning device is actuated to clamp the filler thread F so as to prevent any further delivery thereof to either the arm 171 or the needle 100 until the supply drawn has been disposed in the shed on the next pick. In other words, any delivery of the filler thread from the source of supply to the filler needle is prevented while the needle is being projected into the shed and an amount of filler thread for the next successive pick is measured by the movement of the arm 171 while the needle is being retracted from the shed. This measuring of the weft thread for each pick is another important feature of this invention. By providing such a measuring means, the same length of weft thread is provided in each pick and all of the picks are laid evenly and maintained in the same position in the fabric being woven, thereby providig a uniform product. Also, such a measuring means prevents the weft thread from sagging and interfering with the action of the warp threads and, in general, increases materially the efficiency and operating speed of the loom. This completes one cycle of operation of our loom, and the next and succeeding picks are positioned in the shed and filler thread woven with warps in the same manner as above described.

In our improved loom it will be seen that the jacks and heddles are not only positioned directly next to each other so as to reduce to a minimum the space they occupy in the loom, but that the heddles also are positioned a relatively short distance from the filler needle and fell of the fabric being woven. These features are advantageous in that it is not necessary to move the jacks and heddles a very great distance in order to change and provide the proper shed between the warps. Also, such positioning of the heddles permits the shed to be changed while the filler needle is disposed between the warps as hereinbefore described. Such features permit the loom to operate at greatly increased speeds and which is capable of operating at from 1,000 to 1,500 revolutions per minute, which is, of course, three to four times the speed of other shuttleless looms hereinbefore suggested and used. The positioning of the heddles close to the fell is also advantageous in that strain on the warp threads is reduced considerably and tends to diminish the lag in the warps, which lag, naturally, is greater, the greater distance away from the fell the heddles are positioned.

As a result of our invention, it will be seen that we have provided a loom which is relatively small and compact in its construction so as to consume a minimum amount of space, and a loom which is simple and relatively inexpensive in its construction and operation, and at the same time efficient and effective in its use to provide a quality product. It will be seen that all of the mechanisms are of a simple construction and cooperate with each other in predetermined timed relation. It will be seen also, that the heddles and jacks, due to the construction and operation thereof, may be quickly and conveniently changed in order to obtain the desired woven fabric. The parts and mechanisms of our loom may be easily and conveniently adjusted and after once adjusted do not readily get out of adjustment.

While we have shown and described in this application, one embodiment which our invention may assume in practice, it will be understood that this embodiment is merely for the purpose of illustration and that other forms may be devised within the scope of our invention as set forth in the appended claims.

What we claim as our invention is:

1. In a loom of the class described, means for forming a shed between the warp threads, a weft needle reciprocably mounted to one side of the shed, said needle having an eye for the filler thread arranged therethrough adjacent the free end thereof, the forward edge of said needle being substantially straight throughout the length thereof, and means for moving said needle into and out of the shed so that said free end is projected through to the opposite side thereof with the forward straight edge of said needle in its travel being moved into the fell of the fabric substantially parallel thereto whereby the straight forward edge of said needle beats up the filler threads throughout the width of the fabric and co-extensive therewith, said needle being retracted from the shed along a path near the fell of the fabric.

2. In a loom of the class described, means for forming a shed between the warp threads, a substantially straight weft needle reciprocably mounted to one side of the shed, said needle being relatively flat and having an eye for the filler thread arranged therethrough adjacent the free end thereof extending substantially perpendicular to the path of the warp threads, a channel arranged at least on the upper side of said needle and extending longitudinally throughout the length thereof substantially in alignment with said eye, and means for moving said needle into and out of the shed so that said free end is projected through to the opposite side thereof, with the filler thread adapted to be disposed in said channel whereby the filler thread is protected from interference with the warp threads while the needle together with the filler thread carried thereby is projected into and retracted from the shed.

3. In a loom of the class described, means for forming a shed between the warp threads, a weft needle reciprocably mounted to one side of the shed, said needle being relatively flat and having an eye for the filler thread arranged therethrough adjacent the free end thereof with the forward edge of said needle being substantially straight throughout the length thereof, a channel arranged at least on the upper side of said needle and extending throughout the length thereof substantially parallel to said straight edge and substantially in alignment with said eye, and means for moving said needle into and out of the shed so that said free end is projected through to the opposite side thereof with said needle in its travel being moved into the fell of the fabric to a position substantially parallel thereto whereby the straight forward edge of said needle beats up the filler threads throughout the width of the fabric with said needle being retracted along a path near the fell of the fabric, the filler thread adapted to be disposed in said channel when the needle is projected through the shed whereby the filler thread is protected from interference with the warp threads while the needle together with the filler thread carried thereby is projected into and retracted from the shed.

4. In a loom of the class described having means for actuating the warp threads so as to form a shed, a substantially straight and relatively flat blade-like weft needle reciprocably mounted to one side of the shed having an eye for the weft thread arranged therethrough adjacent the free end thereof extending substantially perpendicular to the path of the warp threads, means for moving said needle into and out of the shed so that said free end is projected through to the opposite side thereof, said needle having a substantially straight forward edge and in its travel adapted to be moved toward and away from the fell of the fabric and acting to project the weft threads through said shed and with the forward edge thereafter acting to move the weft thread throughout the width of the fabric and co-extensive therewith into the fell of the fabric whereby said needle acts as a beating up means, and means arranged along the side opposite that from which said needle is mounted which cooperates with the free end of said needle and the weft thread carried thereby for forming a selvage along that side of the fabric.

5. In a loom of the class described having means for actuating the warp threads so as to form a shed, a substantially straight and relatively thin flat blade-like weft needle reciprocably mounted to one side of the shed having an eye for the weft thread arranged therethrough adjacent the free end thereof extending substantially perpendicular to the path of the warp threads, means for moving said needle into and out of the shed so that said free end is projected through to the opposite side thereof, said needle having a substantially straight forward edge and in its travel adapted to be moved toward and away from the fell of the fabric and acting to project the weft threads through the shed and with the forward edge thereafter acting to move the weft threads throughout the width of the fabric and co-extensive therewith into the fell of the fabric whereby said needle acts as a beating up means, said needle adapted to be moved into and out of the shed substantially in a straight line reciprocatory path with the maximum height of the warp shed being slightly greater than the thickness of said needle, and means arranged along said side opposite that from which said needle is mounted which cooperates with the free end of said needle and the weft thread carried thereby for forming a selvage along that side of the fabric.

6. In a loom of the class described having means for forming a shed, a substantially straight and relatively thin flat, blade-like weft needle reciprocably mounted to one side of the shed having an eye for the weft thread arranged therethrough adjacent the free end thereof extending substantially perpendicular to the path of the warp threads, and means for moving said needle into and out of the shed so that the free end thereof is projected through to the opposite side thereof, said needle having a substantially straight forward edge and in its travel adapted to be moved toward and away from the fell of the fabric, and adapted to project the weft threads through the shed with the forward edge of said needle adapted to move the weft threads throughout the width of the fabric and co-extensive therewith into the fell of the fabric whereby said needle acts as a beating up means, and thereafter adapted to be moved away from the fell of the fabric and retracted in a path substantially parallel thereto.

7. In a loom of the class described, means for actuating the warp threads so as to form a shed, a substantially straight and relatively thin flat blade-like weft needle reciprocably mounted to one side of the shed having an eye for the weft thread arranged therethrough adjacent the free end thereof extending substantially perpendicular to the path of the warp threads, means for moving said needle into and out of the shed so that said free end is projected through to the opposite side thereof, said needle having a substantially straight forward edge and in its travel adapted to be moved toward and away from the fell of the fabric, and acting to project the weft threads through the shed and with the forward edge thereafter acting to move the weft threads throughout the width of the fabric and co-extensive therewith into the fell of the fabric whereby said needle acts as a beating up means, said needle adapted to be moved into and out of the shed substantially in a figure 8 path with the maximum height of the warp shed being slightly greater than the thickness of said needle.

8. In a loom of the class described having means for actuating the warp threads so as to form a shed, a weft needle reciprocably mounted to one side of the shed having an eye for the weft thread arranged therethrough adjacent the free end thereof, means for moving said needle into and out of the shed so that said free end is projected through to the opposite side thereof, said needle in its travel adapted to be moved toward and away from the fell of the fabric, and acting to project the weft threads through the shed to move the weft threads throughout the width of the fabric and co-extensive therewith into the fell of the fabric whereby said needle acts as a beating up means, and means for measuring and paying out an amount of weft thread sufficient for a single pick for each movement of the needle into and through the shed.

9. In a loom of the class described, means for forming a shed, a substantially straight and relatively flat blade-like weft needle reciprocably mounted to one side of the shed having an eye arranged therethrough adjacent the free end thereof extending substantially perpendicular to the path of the warp threads for projecting loops of the weft thread through the shed, a weft thread guide and measuring means through which the thread passes before it reaches the eye in said needle, means for moving said needle into and out of the shed so that said free end is projected through to the opposite side thereof, said needle adapted to draw sufficient yarn for a single pick from said guide and measuring device as the needle passes into the shed.

10. In a loom of the class described, means for forming a shed, a substantially straight and relatively flat blade-like weft needle reciprocably mounted to one side of the shed having an eye arranged therethrough adjacent the free end thereof extending substantially perpendicular to the path of the warp threads for projecting loops of the weft thread through the shed, a weft thread guide and measuring means through which the weft thread passes before it reaches the eye in said needle, means for moving said needle into and out of the shed so that said free end is projected through to the opposite side thereof, said needle adapted to draw sufficient yarn for a single pick from said guide and measuring device as the needle passes into the shed, and means arranged along the side of said shed opposite that side from which the needle is mounted which cooperates with the free end of said needle and the end of the loop of the weft thread carried thereby for forming a selvage along that edge of the fabric.

11. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, a longitudinally extending channel arranged on either side of said needle in alignment with said eye adjacent that edge of the needle disposed nearest to the fell of the fabric in which channels the weft thread is adapted to be disposed, the shed between the warps adapted to be changed while the needle is in its projected position in the shed, so that the warps provide a scissors effect on said needle, thereby maintaining the weft thread in said channels and preventing displacement of the same therefrom, said needle adapted to be retracted from the shed during such scissors effect of said warps on said needle with the warps automatically moving to position to fully form the next shed immediately after the needle is retracted from therebetween.

12. In a loom of the class described, means for forming and changing the shed between the warp threads, a relatively thin weft needle mounted to one side of the shed for reciprocable movement into and out of the shed, said needle having an eye for the weft thread arranged therethrough adjacent the free or outer end thereof for projecting loops of the weft thread through the shed, a longitudinally extending channel arranged on either side of said needle in alignment with said eye adjacent that edge of the needle disposed nearest to the fell of the fabric in which channels the weft thread is adapted to be disposed, an eye member arranged adjacent the opposite or inner end of said needle which is disposed in alignment with the eye in the free end of said said needle and the channels arranged therein so as to insure the positioning of the weft thread in said channels at all times when the needle is disposed in the shed.

13. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, a longitudinally extending channel arranged on either side of said needle in alignment with said eye adjacent that edge of the needle disposed nearest to the fell of the fabric in which channels the weft thread is adapted to be disposed, means forming a loop in that portion of the weft thread disposed on the under side of said needle at a point adjacent the free end in the vicinity of said eye after the needle has been projected through the shed, the shed between the warps adapted to be changed simultaneously with the forming of said loop and while the needle is in its projected position in the shed so that the warps provide a scissors effect on said needle and on said weft thread so as to maintain the loop therein, and means arranged on the side of the shed opposite that from said needle for catching the loop of weft thread.

14. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, a longitudinally extending channel arranged on either side of said needle in alignment with said eye adjacent that edge of the needle disposed nearest to the fell of the fabric in which channels the weft thread is adapted to be disposed, means forming a loop in that portion of the weft thread disposed on the under side of said needle at a point adjacent the free end in the vicinity of said eye after the needle has been projected through the shed, the shed between the warps adapted to be changed simultaneously with the forming of said loop and while the needle is in its projected position in the shed so that the warps provide a scissors effect on said needle and on said weft thread so as to maintain the loop therein, and a knitting needle mounted for reciprocable movement on the side of the shed opposite that from said needle for catching the loop of the weft thread and pulling it through a previously formed loop so as to provide a knitted selvage along that edge.

15. In a loom of the class described, means for forming and changing the shed between the warp threads, a weft needle mounted to one side of the shed for reciprocable movement into and out of the shed, said needle having an eye for the weft thread arranged therethrough adjacent the free end thereof for projecting loops of the weft thread through the shed, means for actuating reciprocably said needle, means for paying out the weft thread to said needle as it is projected and retracted from the shed, said shed forming means, needle actuating means and paying out means being in timed relation so that the shed is changed while the needle is disposed between the warps and so as to provide a loop adjacent the free end of the needle with said loop maintained in its formed position by the scissors effect of said warps due to the changing of the shed, and means for catching the loop at the free end of said needle.

16. In a loom of the class described, means for forming and changing the shed between the warp threads, a weft needle mounted to one side of the shed for movement into and out of the shed, said needle having an eye for the weft thread arranged therethrough adjacent the free end thereof for projecting loops of the weft thread through the shed, means for causing the free end of said needle to move into and out of the shed in such a manner that said end moves thereinto in an arcuate path with the forward edge of said needle being moved into the fell of the fabric as the needle is projected into the shed whereby said edge moves the previous picks of the weft thread into the fell, with the needle then moving away from said fell and retracted from the shed substantially in a straight line movement near the fell.

17. In a loom of the class described, means for forming and changing the shed between the warp threads, a weft needle mounted to one side of the shed for movement into and out of the shed, said needle having an eye for the weft thread arranged therethrough adjacent the free end thereof for projecting loops of the weft thread through the shed, means for causing the free end of said needle to move into and of the shed in such a manner that said end moves thereinto in an arcuate path with the forward edge of said needle being moved into the fell of the fabric being woven as the needle is projected into the shed whereby said edge moves the previous picks of the weft thread into the fell, said needle then being moved away from the fell and moved further into the shed until the end thereof projects beyond the opposite side thereof and then retracted from the shed substantially in a straight line movement near the fell.

18. A weft needle for shuttleless looms of the class described comprising a relatively thin and flat blade-like member having an eye arranged therethrough adjacent one end thereof, and a longitudinally extending channel arranged in each side of said member in alignment with said eye in which channels the weft thread is adapted to be disposed.

19. A weft needle for shuttleless looms of the class described comprising a relatively thin and flat blade-like member, having an eye arranged therethrough adjacent one end thereof, said member being tapered transversely at least from a point intermediate its width to the rear edge thereof, and a longitudinally extending channel arranged in at least one side of said member in alignment with said eye in which channel the weft thread is adapted to be disposed.

20. In a loom of the class described, means for forming a shed between the warps, a weft needle mounted to one side of the shed having an eye for the weft thread arranged therethrough adjacent the free end thereof for projecting loops of the weft thread through the shed, means for moving said needle into and out of the shed, means for applying tension intermittently to the weft thread as it passes to said needle, and movable means positioned between said tensioning means and said needle for drawing a measured quantity of the weft thread through said tensioning means from its source of supply, said last mentioned means adapted to be moved in unison with the reciprocation of said weft needle whereby said means pays off a measured quantity of the weft thread to said needle as it is moved into the shed and prevented by said tension means from drawing the weft thread therethrough from its source of supply, said last mentioned means upon retraction of the weft needle from the shed adapted to draw the weft thread through said tensioning means from its source of supply in an amount sufficient for the next succeeding pick.

21. In a loom of the class described, means for forming a shed between the warps, a weft needle mounted to one side of the shed having an eye for the weft thread arranged therethrough adjacent the free end thereof for projecting loops of the weft thread through the shed, means for applying tension intermittently to the weft thread as it passes to said needle, movable means positioned between said tensioning means and said needle for drawing a measured quantity of the weft thread through said tensioning means from its source of supply, means positioned on the opposite side of said shed for catching the loops of weft thread as they are projected through the shed, the reciprocating movement of said needle, the action of the tensioning means and the movable means for drawing the weft thread therethrough all being in timed relation so that the movable means pays off a measured quantity of weft thread to the needle as it is protracted into the shed and the tensioning means prevents the weft thread from passing to said movable means during such protracted movement but permits the weft thread to be drawn through said tensioning means when said needle is being retracted from the shed and after a loop has been caught by said loop-catching means whereby a measured quantity of weft thread in an amount sufficient for the next pick is drawn through the tensioning means by said movable means upon the retraction of the weft needle.

22. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, means for drawing the weft thread from a source of supply, means for preventing said weft thread drawing means from functioning after a predetermined length of weft thread has been drawn from said source sufficient for a single pick, said weft thread drawing means paying the measured quantity of weft thread to said needle as it is projected through the shed, said last mentioned means functioning to permit said weft thread drawing means to draw the weft thread from the source of supply after said needle has moved to a predetermined point in its retracted travel in the shed so as to provide another quantity of measured weft thread for the next succeeding pick when the needle has reached its fully retracted position.

23. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, oscillating means for drawing the weft thread from a source of supply, means for applying tension to the weft thread after a predetermined length of the weft thread sufficient for a single pick has been drawn so as to prevent the weft thread from passing from the source of supply, said oscillating means adapted to be moved in unison with said needle whereby said oscillating means pays off the measured quantity of weft thread to the needle as it is projected through the shed, said tensioning means functioning to permit said oscillating means to draw the weft thread from the source of supply after said needle has moved to a predetermined point in its retracted travel so as to provide another quantity of measured weft thread for the next succeeding pick when the needle has reached its fully retracted position.

24. In a loom of the class described, means for forming and changing the shed between the warp threads, a relatively thin weft needle mounted to one side of the shed for reciprocable movement into and out of the shed, said needle having an eye for the weft thread arranged therethrough adjacent the free end thereof for projecting loops of the weft thread through the shed, an arm pivotally mounted at one end thereof for oscillating movement for drawing the weft thread from a source of supply, said arm having an eye in the free end thereof through which the weft thread passes, means preventing said arm from drawing the weft thread from said source after a predetermined length of weft thread has been drawn sufficient for a single pick, said arm adapted to be oscillated in unison with the reciprocation of said needle whereby said arm pays off the measured quantity of weft thread to the needle as it is projected through the shed, said last mentioned means functioning to permit said arm to draw the weft thread from the source of supply after said needle has moved to a predetermined point in its retracted travel in the shed so as to provide another quantity of measured weft thread for the next succeeding pick when the needle has reached its fully retracted position.

25. In a loom of the class described, means for moving two groups of warp threads relative to each other alternately in opposite directions to form in each extreme position a shed therebetween, said last mentioned means being positioned a relatively short distance from the fell of the fabric being woven and adapted to move the warp threads a relatively short distance so that the shed formed therebetween is relatively short both in length and height, and a substantially straight and relatively flat weft needle mounted to one side of the warp threads for reciprocable movement into and out of the successively formed sheds for projecting a weft thread therethrough, said needle having an eye arranged therethrough adjacent the outer end thereof extending substantially perpendicular to the path of the warp threads through which eye the weft thread passes.

26. In a loom of the class described, means for moving two groups of warp threads relative to each other alternately in opposite directions to form in each extreme position a shed therebetween, a substantially straight and relatively flat blade-like weft needle mounted to one side of the warp threads for reciprocable movement into and out of the shed for projecting a weft thread therethrough, said needle having an eye arranged therethrough adjacent the outer end thereof extending substantially perpendicular to the path of the warp threads through which eye the weft thread passes, said needle being positioned and adapted to travel into and out of the shed in a path in close proximity to the fell of the fabric, said shed forming means being positioned relatively close to the fell of the fabric and at such a distance therefrom that each of the sheds is just slightly greater than the thickness of the weft needle whereby the shed is changed with a minimum amount of movement of the warp threads.

27. In a loom of the class described, means for moving two groups of warp threads relative to each other alternately in opposite directions to form in each extreme position a shed therebetween, said last mentioned means being positioned a relatively short distance from the fell of the fabric being woven and adapted to move the warp threads a relatively short distance so that the shed formed between said warps is relatively short both in length and height, whereby movement of the warp threads during the changing of the shed is reduced to a minimum, and a weft needle mounted to one side of the warp threads for reciprocable movement into and out of the successively formed sheds for projecting a weft thread therethrough, said shed forming means being in timed relation to said weft needle whereby the warp threads are moved and the shed is being changed while the weft needle is positioned in the shed.

28. In a loom of the class described, means for forming a shed between the warp threads, a weft needle mounted to one side of the shed for reciprocable movement into and out of the shed, said needle having an eye for the weft thread arranged therethrough adjacent the free end thereof for projecting loops of the weft thread through the shed, means for measuring and paying out the weft thread to said needle, the shed forming means, the movement of said needle, and the measuring and paying out means all being in timed relation whereby the shed changes while the needle is projected between the warp threads so that an amount of weft thread sufficient for a single pick is measured out when the needle is being retracted from the shed.

29. In a loom of the class described, means for forming a shed between the warp threads, a weft needle mounted to one side of the shed for reciprocable movement into and out of the shed, said needle having an eye for the weft thread arranged therethrough adjacent the free end thereof for projecting loops of the weft thread through the shed, an oscillating member upon which said needle is slidably mounted for moving the needle laterally, means for measuring and paying out the weft thread to said needle, said oscillating member adapted to move said needle into the shed in an arcuate path until the forward edge thereof is positioned substantially in the fell of the fabric so as to beat up the previous picks of weft thread and adapted to be retracted from the shed substantially in a straight line movement adjacent the fell, the shed forming means, the movement of the needle and the measuring and paying out means all being in timed relation whereby the shed is changed while the needle is projected between the warps so that an amount of weft thread sufficient for a single pick is measured out when the needle is being retracted from the shed.

30. In a loom of the class described, means for forming a shed between the warp threads, a weft needle mounted to one side fo the shed for reciprocable movement into and out of the shed, said needle having an eye for the weft thread arranged therethrough adjacent the free end thereof for projecting loops of the weft thread through the shed, an oscillating member upon which said needle is slidably mounted for moving the needle laterally, said oscillating member adapted to move said needle into the shed in an arcuate path until the forward edge thereof is positioned substantially in the fell of the fabric so as to beat up the previous picks of the weft thread and adapted to be retracted from the shed in substantially a straight line movement adjacent the fell, oscillating means positioned rearwardly of said needle through which the weft thread passes, tensioning means through which the weft thread passes to said oscillating member, said oscillating means adapted to act in unison with the movement of said needle whereby the weft thread is paid off to said needle as it is moved into the shed, the shed forming means, the movement of said needle, the oscillating member, the oscillating means and the tensioning means all being in timed relation whereby the shed is changed while the needle is projected between the warps so that said tensioning means will not permit the weft thread to pass to said oscillating means or needle when the needle is being moved into the shed but permits said oscillating means to draw a sufficient amount of weft thread for a single pick through said tensioning means when the needle is being retracted from the shed.

31. In a loom of the class described, means for forming a shed between the warp threads, a substantially straight and relatively flat weft needle mounted to one side of the shed for reciprocable movement into and out of the shed, means carried by the outer end of said needle for projecting loops of the weft thread through the shed, means in cooperation with the movement of the needle and the clamping action of the warp threads on the needle when the shed is changing for forming a loop in the weft thread to one flat side of the needle adjacent the outer end thereof and said last mentioned means, and means arranged on that side of the shed opposite that from which said needle is mounted for engaging said loop formed in the weft thread whereby a selvage is formed along that edge of the fabric.

32. In a loom of the class described, means for forming a shed between the warp threads, a substantially straight and relatively flat weft needle mounted to one side of the shed for reciprocable movement into and out of the shed, means carried by the outer end of said needle for projecting loops of the weft thread through the shed, means in cooperation with the movement of the needle and the clamping action of the warp threads on the needle when the shed is changing for forming a loop in the weft thread to one flat side of the needle adjacent the outer end thereof and said last mentioned means, and a knitting needle reciprocally arranged along that side of the shed opposite that from which said weft needle is mounted for engaging the loops formed in the weft thread whereby a selvage is formed along that edge of the fabric.

33. In a loom of the class described, means for forming a shed between the warp threads, a substantially straight and relatively flat weft needle mounted to one side of the shed for reciprocable movement into and out of the shed, said needle having an eye arranged in the outer end thereof extending substantially perpendicular to the path of the warp threads in which the weft thread is disposed for projecting loops of the weft thread through the shed, means in cooperation with the movement of the needle and the clamping action of the warp threads on the needle when the shed is changing for forming a loop in the weft thread adjacent said eye at the outer end of said needle when a loop of weft thread has been projected through the shed, and means arranged on that side of the shed opposite that from which said needle is mounted for engaging said loop formed in the weft thread whereby a selvage is formed along that edge of the fabric.

34. In a loom of the class described, means for forming a shed between the warp threads, a substantially straight and relatively flat weft needle mounted to one side of the shed for reciprocable movement into and out of the shed, said needle having an eye arranged in the outer end thereof extending substantially perpendicular to the path of the warp threads in which the weft thread is disposed for projecting loops of the weft thread through the shed, means in cooperation with the movement of the needle and the clamping action of the warp threads on the needle when the shed is changing for forming a loop in the weft thread adjacent said eye at the outer end of said needle when a loop of weft thread has been projected through the shed, and a knitting needle reciprocally arranged along that side of the shed opposite that from which said weft needle is mounted for engaging said loop formed in the weft thread whereby a knitted selvage is formed along that edge of the fabric.

35. In a loom of the class described, an oscillating member arranged to one side of the shed, a substantially straight and relatively flat weft needle mounted on said member, means for reciprocating said needle relative to said oscillating member so that loops of the weft thread are projected through the shed, said needle adapted to pass in a curved path when moving into and through the shed and substantially in a straight line movement adjacent the fell of the fabric when being retracted therefrom.

36. In a loom of the class described, an oscillating member arranged to one side of the shed, a substantially straight and relatively flat weft needle mounted on said member for projecting loops of weft thread through the shed, means for actuating said oscillating member and said needle whereby said needle passes into and through the shed in a curved path into the fell of the fabric substantially parallel thereto so that said needle beats up the filler threads throughout the width of the fabric and co-extensive therewith and is retracted from the shed in substantially a straight line path adjacent the fell of the fabric.

37. In a loom of the class described, a substantially straight and relatively flat weft needle mounted to one side of the shed for projecting loops of the weft thread into and through the shed, said needle being substantially straight throughout the length thereof having an eye arranged therethrough adjacent the outer end thereof extending substantially perpendicular to the path of the warp threads, means for maintaining the loop of weft thread directly next to and substantially in the plane thereof and in alignment with the eye in said needle at all times so as not to interfere with the warp threads while passing through the shed, and means for actuating said needle so that it is projected into and through the shed to the opposite side thereof and retracted from the shed in a path adjacent the fell of the fabric.

38. In a loom of the class described, a substantially straight and relatively flat weft needle mounted to one side of the shed for projecting loops of the weft thread into and through the shed, said needle being substantially straight throughout the length thereof and having an eye for the weft thread arranged therethrough adjacent the free end thereof extending substantially perpendicular to the path of the warp threads, means carried by said needle for maintaining the loop of weft thread directly next to and substantially in the plane thereof so as not to interfere with the warp threads while passing through the shed, means for maintaining the weft thread taut and in alignment at all times with the eye in said needle and said last mentioned means, and means for actuating said needle so that it is projected in a path at a spaced distance from the fell of the fabric into and through the shed to the opposite side thereof and retracted from the shed in a path adjacent the fell of the fabric.

39. In a loom of the class described, means for forming a shed between the warp threads, a weft needle mounted to one side of the shed for reciprocable movement into and out of the shed, means for actuating said needle so as to project loops of the weft thread through the shed, means cooperating with said last mentioned means for measuring off a predetermined length of weft thread for the next succeeding pick while said needle is being moved out of the shed to its retracted position, and means arranged on that side of the shed opposite that from which said needle is mounted for engaging said loops formed in the weft thread whereby a selvage is formed along that edge of the fabric.

40. In a loom of the class described, as defined in claim 39, wherein the means for measuring off a predetermined length of weft thread for the next succeeding pick consists of an oscillating arm having an eye arranged in the outer end thereof through which the weft thread passes, and means for actuating said arm in timed relation to said needle actuating means whereby a predetermined length of weft thread is drawn from its source of supply while the needle is being moved to its retracted position.

41. In a loom of the class described, means for forming and changing the shed between the warp threads, a substantially straight and relatively thin and flat weft needle mounted to one side of the shed for reciprocable movement into and out of the shed, said needle having an eye for the weft thread arranged therethrough adjacent the outer end thereof extending substantially perpendicular to the path of the warp threads for projecting loops of the weft thread into and through the shed, a longitudinally extending channel arranged on either side of the said needle in alignment with said eye in which the weft thread is adapted to be disposed so as not to interfere with the movement and action of the warp threads.

42. In a loom of the class described, the combination as defined in claim 41, wherein the longitudinally extending channel arranged on either side of the weft needle is constructed and arranged so as to provide a shelf-like portion extending substantially through the length of the needle.

43. In a loom of the class described, means for forming and changing the shed between the warp threads, a substantially straight and relatively thin and flat weft needle mounted to one side of the shed for reciprocable movement into and out of the shed, said needle having an eye for the weft thread arranged therethrough adjacent the outer end thereof extending substantially perpendicular to the path of the warp threads for projecting loops of the weft thread into and through the shed, means carried by said needle for housing the loop of weft thread as it is projected into the shed so as to protect the weft threads from the movement and action of the warp threads.

44. In a loom of the class described, the combination as defined in claim 43, wherein the extreme outer free end of the needle is tapered so as to provide a blunt pointed end for entry into the shed between the warp threads.

45. A weft needle for shuttleless looms of the class described, comprising a relatively thin and flat blade-like member having an eye arranged therethrough adjacent the outer end thereof, the extreme outer end of the said needle being tapered so as to provide a blunt pointed end, said tapered end terminating in a tapered portion having a greater degree of taper than the first mentioned tapered portion and which acts to wipe the filler threads into the fell of the fabric.

OSBORNE FIRING.
LEONARD M. DORMAN.

REFERENCES CITED

The following references are of record in the file of this patent:

UNITED STATES PATENTS

| Number | Name | Date |
| --- | --- | --- |
| 64,573 | Robjohn | May 7, 1867 |
| 96,564 | Duckworth | Nov. 9, 1869 |
| 342,060 | Arnold | May 18, 1886 |
| 700,613 | Brindle | May 20, 1902 |
| 1,164,137 | Stewart | Dec. 14, 1915 |
| 1,296,024 | Waite | Mar. 4, 1919 |
| 1,337,259 | Parker | Apr. 20, 1920 |
| 2,089,620 | Rossmann | Aug. 10, 1937 |
| 2,180,831 | Libby | Nov. 21, 1939 |
| 2,180,832 | Libby | Nov. 21, 1939 |
| 2,247,760 | MacDonald | July 1, 1941 |
| 2,258,538 | Clutsom | Oct. 7, 1941 |
| 2,356,964 | Alderfer | Aug. 29, 1944 |

FOREIGN PATENTS

| Number | Country | Date |
| --- | --- | --- |
| 593,707 | France | June 2, 1925 |